(12) United States Patent
Taniguchi et al.

(10) Patent No.: US 12,234,162 B2
(45) Date of Patent: Feb. 25, 2025

(54) WATER PURIFICATION CARTRIDGE

(71) Applicant: UNITIKA LTD., Amagasaki (JP)

(72) Inventors: Shinji Taniguchi, Osaka (JP); Norihiro Naito, Uji (JP)

(73) Assignee: UNITIKA LTD., Amagasaki (JP)

( * ) Notice: Subject to any disclaimer, the term of this patent is extended or adjusted under 35 U.S.C. 154(b) by 760 days.

(21) Appl. No.: 17/291,857

(22) PCT Filed: Sep. 30, 2019

(86) PCT No.: PCT/JP2019/038527
§ 371 (c)(1),
(2) Date: May 6, 2021

(87) PCT Pub. No.: WO2020/095573
PCT Pub. Date: May 14, 2020

(65) Prior Publication Data
US 2022/0009797 A1    Jan. 13, 2022

(30) Foreign Application Priority Data

Nov. 7, 2018   (JP) .................. 2018-209623

(51) Int. Cl.
*C02F 1/28* (2023.01)
*B01D 39/20* (2006.01)
(Continued)

(52) U.S. Cl.
CPC .......... *C02F 1/283* (2013.01); *B01D 39/2065* (2013.01); *B01J 20/20* (2013.01);
(Continued)

(58) Field of Classification Search
None
See application file for complete search history.

(56) References Cited

U.S. PATENT DOCUMENTS 2,758,719 A   8/1956   Line
3,542,202 A   11/1970  Ball
(Continued)

FOREIGN PATENT DOCUMENTS

JP        7-37682 Y2    8/1995
JP        2000-288314 A  10/2000
(Continued)

OTHER PUBLICATIONS

Extended European Search Report for European Application No. 19881838.7, dated Jul. 13, 2022.
(Continued)

*Primary Examiner* — Richard C Gurtowski
(74) *Attorney, Agent, or Firm* — Birch, Stewart, Kolasch & Birch, LLP

(57) ABSTRACT

A water purification cartridge includes a casing with a tubular shape that has an inflow portion for raw water to flow in and an outflow portion for purified water to flow out, and a filter member for filtering the raw water, the filter member being accommodating within the casing. The filter member is formed to have a cylindrical shape having a hollow portion, and has a first face and a second face at respective ends in an axial direction. The casing has a first cover portion, a second cover portion, and a side wall portion. The first cover portion covers the first face. The second cover covers the second face. The side wall portion covers an outer circumferential face of the filter member. In the first cover portion, a first contact portion is formed that annularly comes into contact with the first face and that press the filter member in the axial direction to elastically deform the filter member. In the second cover portion, a second contact portion is formed that annularly comes into contact with the second face and that press the filter member in the axial direction to elastically deform the filter member.

20 Claims, 20 Drawing Sheets

(51) Int. Cl.
   *B01J 20/20* (2006.01)
   *B01J 20/28* (2006.01)

(52) U.S. Cl.
   CPC ... *B01J 20/28023* (2013.01); *C02F 2201/006* (2013.01); *C02F 2307/04* (2013.01)

(56) References Cited

U.S. PATENT DOCUMENTS

| | | | | |
|---|---|---|---|---|
| 5,169,528 | A | * | 12/1992 | Karbachsch ........... B01D 39/02 96/135 |
| 5,580,451 | A | | 12/1996 | Tack |
| 6,454,941 | B1 | * | 9/2002 | Cutler ..................... C02F 1/003 210/282 |
| 2009/0014498 | A1 | * | 1/2009 | Matsumura ............. H01L 24/83 228/3.1 |
| 2012/0055862 | A1 | * | 3/2012 | Parekh ..................... C02F 1/42 210/244 |
| 2014/0217005 | A1 | | 8/2014 | Takeda |
| 2015/0353383 | A1 | * | 12/2015 | Hirsch ............... B01D 35/1475 210/323.1 |

FOREIGN PATENT DOCUMENTS

| | | |
|---|---|---|
| JP | 2002-346550 A | 12/2002 |
| JP | 2014-138929 A | 7/2014 |
| JP | 2017-64571 A | 4/2017 |
| JP | 6204820 B2 | 9/2017 |
| WO | WO 2013/035748 A1 | 3/2013 |

OTHER PUBLICATIONS

International Search Report (PCT/ISA/210) issued in PCT/JP2019/038527, dated Dec. 3, 2019.
Canadian Office Action for Canadian Application No. 3,125,729, dated Nov. 29, 2023.

* cited by examiner

WATER PURIFICATION CARTRIDGE

TECHNICAL FIELD

The present invention relates to a water purification cartridge.

BACKGROUND ART

Patent Literature 1 discloses a water purification cartridge for a pot-type water purifier. This water purifier includes a lid in which a water inflow portion for raw water to flow in is formed, and a casing body in which a water outflow portion for purified water to flow out is formed. A space between the water inflow portion and the water outflow portion is filled with a molded water purification material that has a hollow cylindrical shape, with the lid attached to the casing body.

CITATION LIST

Patent Literature

Patent Literature 1: JP 6204820B

SUMMARY OF INVENTION

Technical Problem

In this water purification cartridge, a central flow path is formed in a hollow portion of the molded water purification material, and an external flow path is formed between the molded water purification material and the casing body. The water inflow portion is in communication with and connected to the central flow path. Raw water flows from the water inflow into the central flow path, passes through the molded water purification material outward in a radial direction, passes through the external flow path, and flows out, as purified water, from a stream outlet. The central flow path and the external flow path are separated by a first elastic member, which comes into intimate contact with an upper end face of the molded water purification material and a lower end face of the lid, and a second elastic member, which comes into intimate contact with a lower end face of the molded water purification material and a bottom face of the casing body. Thus, raw water and purified water are prevented from mixing. This water purification cartridge needs the elastic members to seal the end faces of the molded water purification material, and a portion between the molded water purification material and the casing and lid. However, there has been a desire for development of a water purification cartridge in which raw water and purified water can be separated with a simpler structure.

The present invention aims to provide a water purification cartridge in which raw water and purified water can be separated with a simpler structure.

Solution to Problem

A water purification cartridge according to a first aspect of the present invention includes: a casing with a tubular shape that has an inflow portion for raw water to flow in, and an outflow portion for purified water to flow out; and a filter member for filtering the raw water, the filter member being accommodated within the casing. The filter member is elastic and formed to have a cylindrical shape having a hollow portion, and has a first face and a second face at respective ends in an axial direction. The casing includes: a first cover portion that covers the first face of the filter member; a second cover portion that covers the second face of the filter member; and a side wall portion that covers an outer circumferential face of the filter member. In the first cover portion, a first contact portion is formed that annularly comes into contact with the first face of the filter member so as to surround a circumference of the hollow portion and that presses the filter member in the axial direction to elastically deform the filter member. In the second cover portion, a second contact portion is formed that annularly comes into contact with the second face of the filter member so as to surround the circumference of the hollow portion and that presses the filter member in the axial direction to elastically deform the filter member. The filter member is accommodated within the casing in a state where the filter member is elastically deformed by a pressing force of the first contact portion and the second contact portion.

According to this configuration, the first contact portion of the first cover portion and the second contact portion of the second cover portion are in contact with the first face and the second face, respectively, of the elastic filter member. A compressive force is applied to the filter member in the axial direction thereof from these contact portions, and the passage of water from the first face and the second face of the filter member is suppressed. This configuration can be applied to water purification cartridges of both the in-out type, in which raw water passes from the hollow portion to the outer circumferential face of the filter member, and the out-in type, in which raw water passes from the circumference to the hollow portion of the filter member.

A water purification cartridge according to a second aspect of the present invention is the water purification cartridge according to the first aspect, wherein at least one of the first contact portion and the second contact portion is an annular protrusion.

A cartridge according to a third aspect of the present invention is the water purification cartridge according to the first or second aspect, wherein the casing is made of a plastic material, and the filter member contains fibrous activated carbon, and the hardness thereof is 86 or less.

A cartridge according to a fourth aspect of the present invention is the water purification cartridge according to any one of the first to third aspects, wherein a sealant is applied to at least one of the first face of the filter member and the second face of the filter member.

A water purification cartridge according to a fifth aspect of the present invention is the water purification cartridge according to any one of the first to fourth aspects, wherein at least one of the first cover portion and the second cover portion includes a rib extending in the axial direction of the filter member, and the filter member is accommodated in a state of being positioned by the rib so as to have a space between the outer circumferential face of the filter member and the side wall portion of the casing.

A water purification cartridge according to a sixth aspect of the present invention is the water purification cartridge according to any one of the first to fifth aspects, wherein an elastic member is not provided between the first contact portion and the first face of the filter member and between the second contact portion and the second face of the filter member.

A water purification cartridge according to a seventh aspect of the present invention is the water purification cartridge according to any one of the first to sixth aspects, wherein the raw water that has flowed in from the inflow portion of the casing flows into the hollow portion of the filter member via the first cover portion, passes outward in a radial direction through the filter member and flows out, as the purified water, to a space between the outer circumferential face of the filter member and the side wall portion of the casing, and is discharged from the outflow portion to the outside.

A water purification cartridge according to an eighth aspect of the present invention is the water purification cartridge according to any one of the first to seventh aspects, wherein the casing further has, between the outer circumferential face of the filter member and the outflow portion, a first resisting portion serving as a resistance against a flow of the purified water that has flowed out to the space between the outer circumferential face of the filter member and the side wall portion of the casing.

According to the eight aspect of the present invention, purified water that has flowed out to the space between the outer circumferential face of the filter member and the side wall portion of the casing is prevented from flowing by the first resisting portion and remains within the casing unless the pressure of the purified water is greater than or equal to a certain pressure. Thus, purified water is prevented from becoming droplets and dropping from the outflow portion.

A water purification cartridge according to a ninth aspect of the present invention is the water purification cartridge according to any one of the first to eighth aspects, wherein the raw water that has flowed in from the inflow portion of the casing flows into a space between the outer circumferential face of the filter member and the side wall portion of the casing via the first cover portion, passes inward in a radial direction through the filter member and flows out, as the purified water, to the hollow portion of the filter member, and is discharged from the outflow portion to the outside.

A water purification cartridge according to a tenth aspect of the present invention is the water purification cartridge according to any one of the first to ninth aspects, wherein the casing further has, between the hollow portion of the filter member and the outflow portion, a second resisting portion serving as a resistance against a flow of the purified water that has flowed out to the hollow portion.

According to the tenth aspect of the present invention, purified water that has flowed out to the hollow portion of the filter member is prevented from flowing by the second resisting portion and remains within the casing unless the pressure or purified water is larger than or equal to a certain pressure. Thus, purified water is prevented from becoming droplets and dropping from the outflow portion.

Advantageous Effects of Invention

In the water purification cartridge according to the present invention, the elastic filter member is accommodated within the casing that includes the first cover portion and the second cover portion. The first contact portion formed in the first cover portion comes into contact with the first face of the filter member, and elastically deforms the filter member by pressing the filter member in the axial direction. The second contact portion formed in the second cover portion comes into contact with the second face of the filter member, and elastically deforms the filter member by pressing the filter member in the axial direction. As a result, the passage of water via the first face and the second face, which are located at respective ends of the filter member, is suppressed, and raw water and purified water are separated with a simple structure. Further, according to the present invention, the first contact portion annularly comes into contact with the filter member so as to surround the circumference of the hollow portion. Similarly, the second contact portion annularly comes into contact with the filter member so as to surround the circumference of the hollow portion. This configuration can prevent raw water that has flowed into the water purification cartridge from passing through a gap between the first face and the first cover and a gap between the second face and the second cover portion, and can promote the passage of raw water through the filter member.

DESCRIPTION OF EMBODIMENTS

A. First Embodiment

Figure 1:
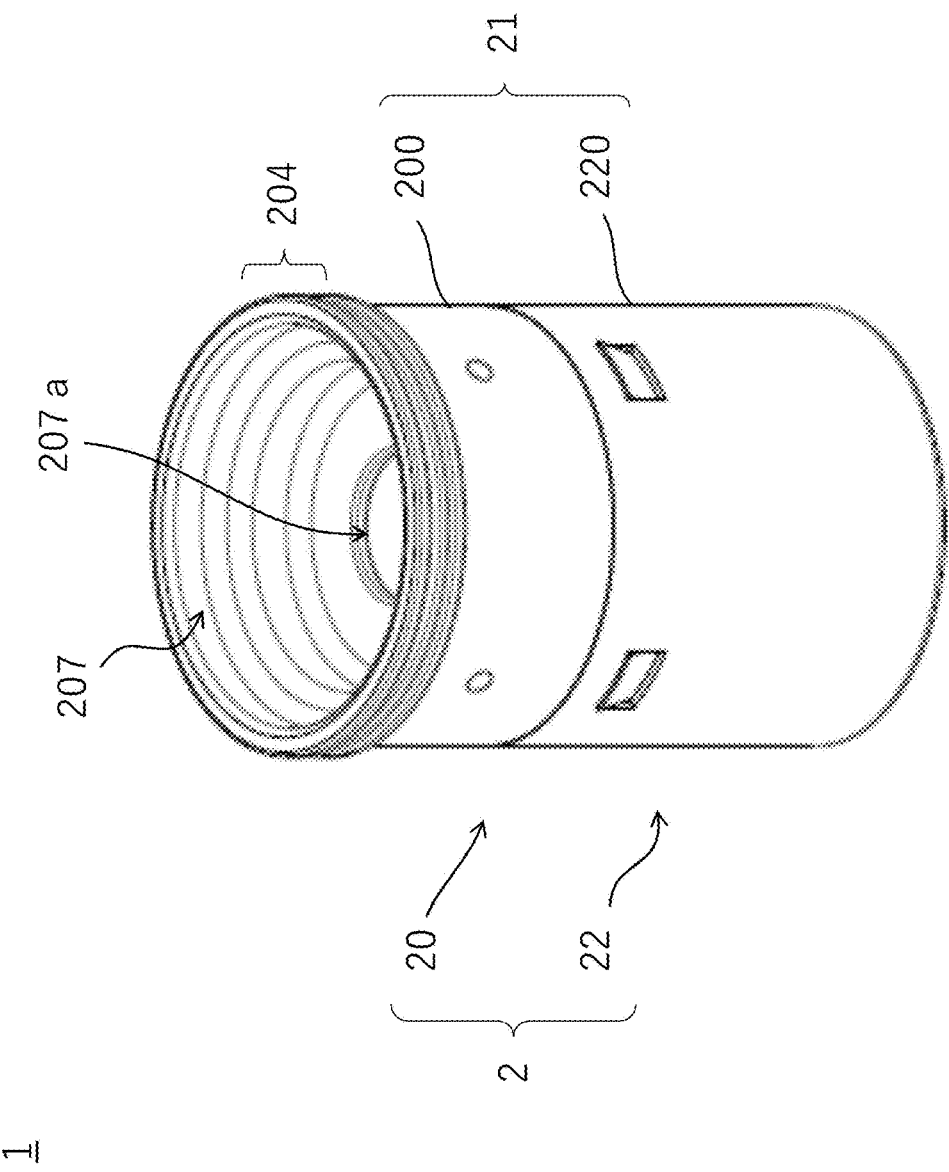
FIG. 1 is an external perspective view of an in-out type cartridge.
Figure 3A:
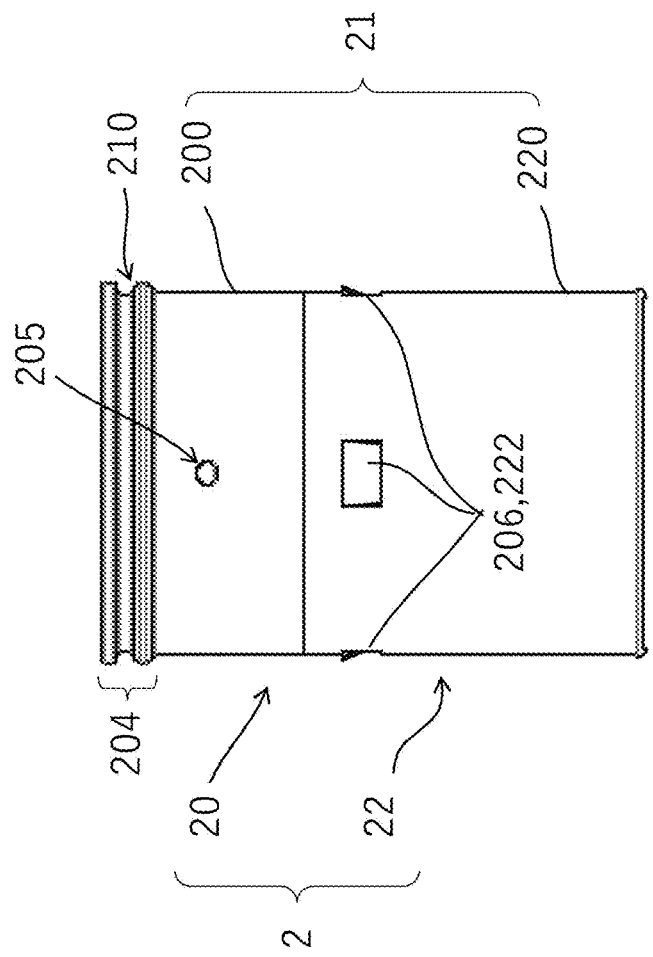
FIG. 3A is a front view of a cartridge.
Figure 3B:
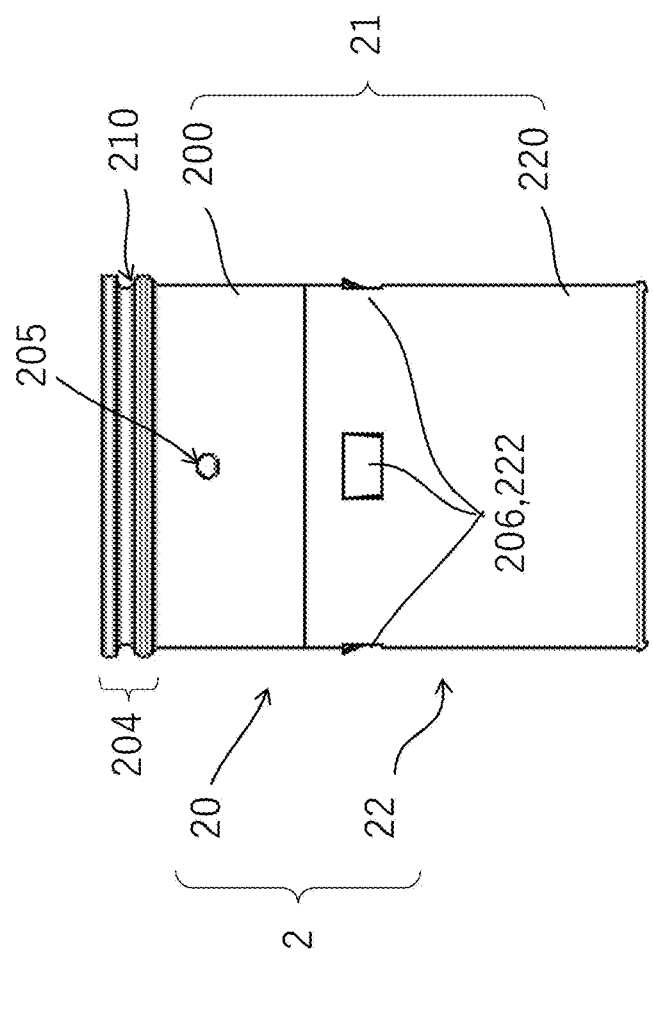
FIG. 3B is a back view of the cartridge.
Figure 3C:
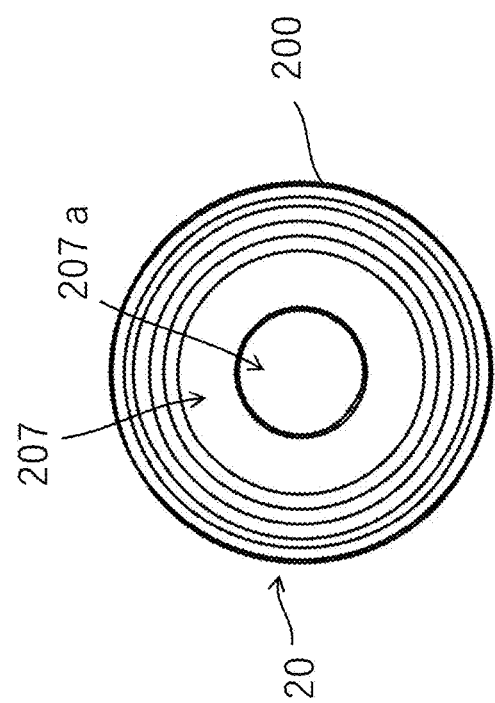
FIG. 3C is a top view of the cartridge.

A first embodiment of a water purification cartridge according to the present invention will be described below with reference to the diagrams. FIG. 1 is an external perspective view of a water purification cartridge (which may be hereinafter referred to simply as a cartridge) 1 according to the present embodiment, and FIG. 3A is a front view of FIG. 1. In the following, for convenience of description, the vertical direction in FIG. 3A is referred to as "above (up, upper etc.)/below (down, lower etc.)", the left-right direction in FIG. 3A is referred to as "left/right" or "horizontal", and the paper plane direction in FIG. 3A is referred to as "front/back", and the description is given based on these directions.

<1. Summary of Water Purification Cartridge>

Figure 13A:
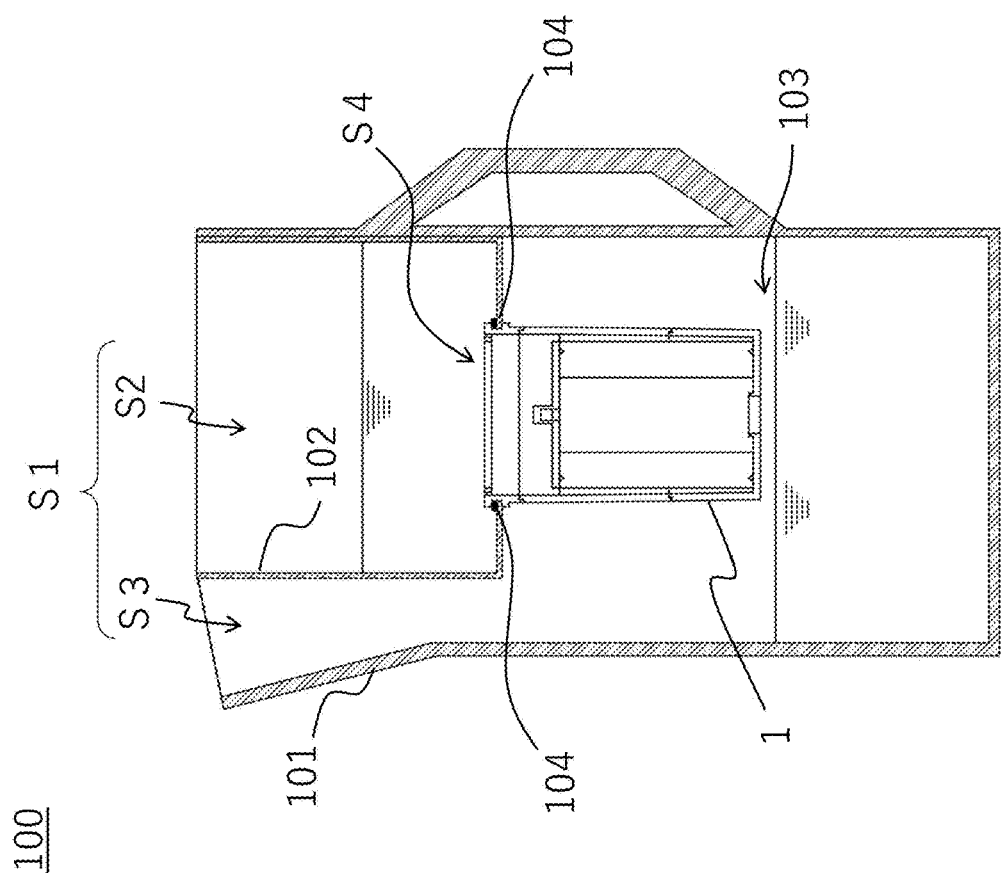
FIG. 13A is a cross-sectional schematic diagram of a pot-type water purifier that uses the in-out type cartridge.

The cartridge 1 is mainly used in a pot-type (server-type) water purifier in which raw water passes through the cartridge 1 due to the weight of the raw water. FIG. 13A shows an example of the water purifier. As shown in FIG. 13A, this water purifier 100 includes a housing 101 that has an opening S1 in an upper portion. The housing 101 contains a tank 102, which is open in an upper portion. The tank 102 is a portion for storing raw water, and raw water can be poured into the tank 102 through an upper opening S2. An opening S4 is formed in a bottom portion of the tank 102, and the cartridge 1 is attached together with a packing 104 so as to seal a peripheral portion of the opening S4. Raw water in the tank 102 flows into the cartridge 1. Note that since the opening S2 is formed to be smaller than the opening S1, the opening S1 is divided into the opening S2 and an opening S3.

After passing through the inside of the cartridge 1, raw water flows out, as purified water, from a lower side of the cartridge 1, and is stored in a server space 103 below the tank 102. The opening S3 functions as an outlet for taking out purified water from the server space 103.

As shown in FIGS. 1 to 4, the cartridge 1 according to the present embodiment has a tubular shape as a whole, and typically has a substantially cylindrical shape. The cartridge 1 includes a casing 2 and a filter member 3 that has a substantially cylindrical shape that is accommodated within the casing 2. The cartridge 1 of the present embodiment is an in-out type cartridge in which raw water that has flowed into a hollow portion of the filter member 3 passes through the filter member 3 outward in the radial direction, and flows out, as purified water, into a space between an outer circumferential face 320 of the filter member 3 and a side wall portion of the casing 2.

Figure 2:
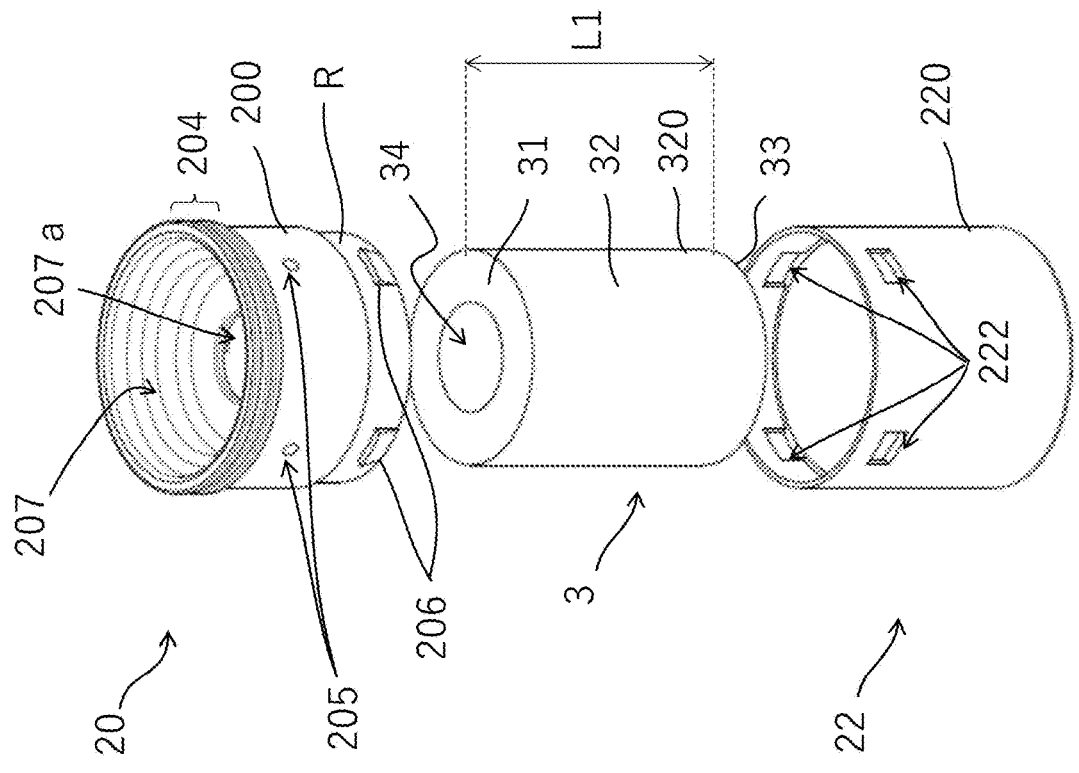
FIG. 2 is an external perspective view of a casing and a filter member.
Figure 4:
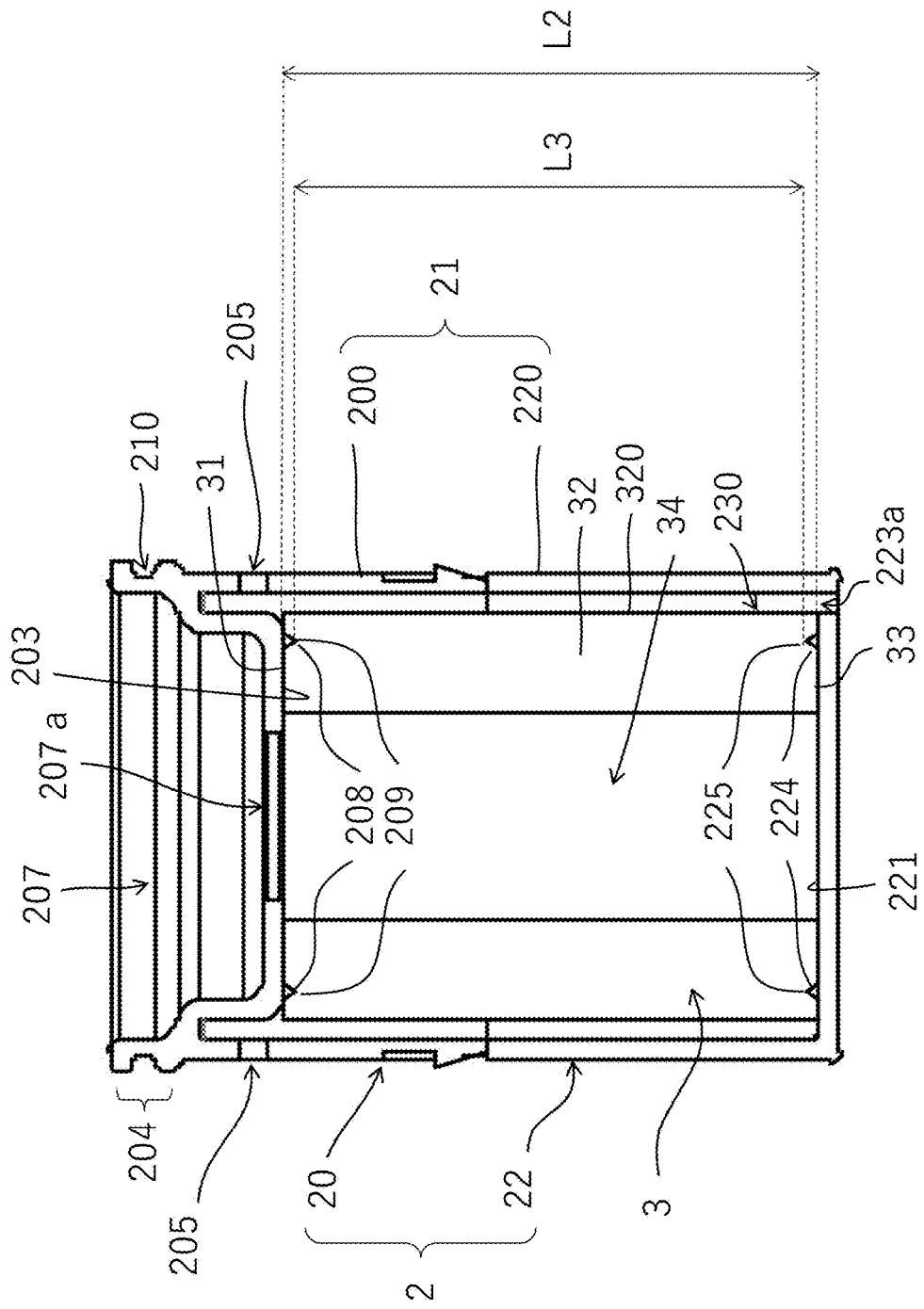
FIG. 4 is a cross-sectional view of the in-out type cartridge.

The filter member 3 is a member for filtering raw water and make the raw water into purified water. As shown in FIG. 2, the filter member 3 has, at the center, a hollow portion 34 that has a substantially circular shape as viewed from above, and has a first face 31 and a second face 33 at respective ends in the axial direction. The filter member 3 further has a side circumferential portion 32 that is continuous with the first face 31 and the second face 33 and extends in the axial direction. The filter member 3 is accommodated in the casing 2 in an orientation in which the first face 31 faces upward and the second face 33 faces downward. This state is referred to as an accommodated state. The outer diameter of the filter member 3 is smaller than the inner diameter of the side wall portion 21 of the casing 2. Thus, in the accommodated state, an annular space 230 is formed between the outer circumferential face 320 of the filter member 3 and the side wall portion 21 of the casing 2, as shown in FIG. 4.

<2. Casing>

The casing 2 includes a first cover portion that covers the first face 31 of the filter member 3, a second cover portion that covers the second face 33 of the filter member 3, and a side wall portion that covers the outer circumferential face 320 of the filter member 3. As shown in FIG. 2, the casing 2 of the present embodiment is constituted by a first cover portion 20 that covers the first face 31 of the filter member 3 and the second cover portion 22 that covers the second face 33 of the filter member 3, and the first cover portion 20 and the second cover portion 22 are connected to each other so as to be able to, or not able to, be detached from each other, as will be described later. The side wall portion 21 is constituted by a side wall portion 200 of the first cover portion 20 and a side wall portion 220 of the second cover portion 22 that will be described later. In the following, a state where the first cover portion 20 and the second cover portion 22 are connected is referred to as a connected state. In the connected state, a space for accommodating the filter member 3 is formed within the casing 2.

The first cover portion 20 has the side wall portion 200 that has a substantially cylindrical shape, and an inflow portion 207 that is surrounded by the side wall portion 200. The inflow portion 207 is a portion that puts the inside and the outside of the cartridge 1 in communication with each other. That is to say, in the state shown in FIG. 13A, raw water in the tank 102 flows into the cartridge 1 via the inflow portion 207. As shown in FIG. 4, the inflow portion 207 has a face 203 that is continuous from the side wall portion 200 and formed to have a flat-bottomed container shape that is recessed downward, and opposes the internal space in the casing 2. A circular open hole 207a for raw water to flow into the cartridge 1 is formed at the center of the face 203. In the accommodated state, the hollow portion 34 of the filter member 3 is located generally immediately below the open hole 207a, and raw water flows from the open hole 207a into the hollow portion 34 of the filter member 3. The face 203 of the first face cover portion in the accommodated state can come into intimate contact with the first face 31 of the filter member 3. Particularly, in the water purification cartridge according to the present invention, the filter member 3 is accommodated within the casing 2 in a state where the filter member 3 is elastically deformed by pressing force of a first contact portion of the first cover portion 20 and a second contact portion of the second cover portion 22, as will be described later. With this configuration, raw water that has flowed into the hollow portion 34 of the filter member 3 can be prevented from passing through a gap between the first face 31 and the first cover portion 20 and a gap between the second face 33 and the second cover portion 22, and the passage of raw water through the filter member 3 can be promoted, without an elastic member being provided between a molded water purification material and a casing and lid as in the water purification cartridge described in Patent Literature 1.

The side wall portion 200 is formed so as to extend in the vertical direction from a position at which the face 203 is formed. A flange 204 for attaching the cartridge 1 to a peripheral portion of the opening S4 is formed at a portion on the outer side of the side wall portion 200 and above the open hole 207a. A groove 210 that extends in the circumferential direction is formed at the center in the vertical direction of the flange 204. The groove 210 is a portion to which the packing 104 for sealing a gap between the cartridge 1 and the peripheral portion of the opening S4 is fitted when the cartridge 1 is attached to the peripheral portion of the opening S4.

Vents 205 are formed at a position below the flange 204 of the side wall portion 200 and above the face 203. The inside and the outside of the casing 2 are in communication with each other through the vents 205. When raw water flows into the cartridge 1, air in the cartridge 1 (casing 2) is discharged via the vents 205, allowing water passing through the cartridge 1 to move more smoothly. The vents 205 are arranged so as to be located within the server space 103 in a state where the cartridge 1 is attached to the peripheral portion of the opening S4 and to be located above the first face 31 of the filter member 3.

As shown in FIG. 2, a thin region R, in which the thickness of the side wall portion 200 is smaller than that in the other portion, is formed at a position on the outer side of the side wall portion 200 and below the vents 205. A plurality of claw portions 206, each of which protrudes outward in the radial direction and has a substantially rectangular shape, are formed at intervals in the circumferential direction in the thin region R. The claw portions 206 enable the first cover portion 20 and the second cover portion 22 to be connected to each other by engaging with later-described window portions 222 of the second cover portion 22. Note that the connecting means using the claw portions 206 and the window portions 222 has been described merely as an example of a means for connecting the first cover portion 20 and the second cover portion to each other, and the connecting means is not specifically limited thereto. Another example may be connection using welding or adhesion, or connection using screw fitting, for example.

As shown in FIG. 4, a first protrusion 208, which protrudes from the face 203 toward the internal space of the casing 2 and has an annular shape, is formed in the face 203 of the first cover portion 20. In the accommodated state, the first protrusion 208 annularly comes into contact with the first face 31 of the filter member 3 so as to surround the hollow portion 34 of the filter member 3, and presses the filter member 3 in the axial direction to elastically deform the filter member 3. In this case, the first protrusion 208 serves as the first contact portion that annularly comes into contact with the first face 31 of the filter member 3 so as to surround the outer circumferential face of the hollow portion 34, and presses the filter member 3 in the axial direction to elastically deform the filter member 3. In the water purification cartridge of the present invention, the face 203 may alternatively be a face that does not have a protrusion. For example, the face 203 may be flat. In this case, the face 203 serves as the first contact portion that annularly comes into contact with the first face 31 of the filter member 3 so as to surround the outer circumference of the hollow portion 34, and presses the filter member 3 in the axial direction to elastically deform the filter member 3. The cross-sectional shape of the first protrusion 208 is not specifically limited, but may be a substantially triangular shape, a substantially rectangular shape, a substantially semicircular shape, a substantially semi-oval shape, or the like. Corners of the substantially triangular shape and the substantially rectangular shape may be rounded.

Figure 3D:
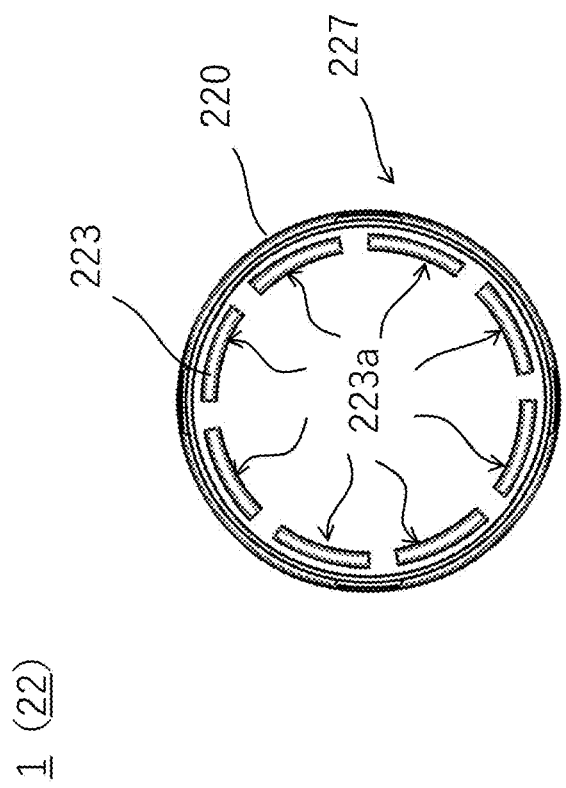
FIG. 3D is a bottom view of the cartridge.
Figure 3E:
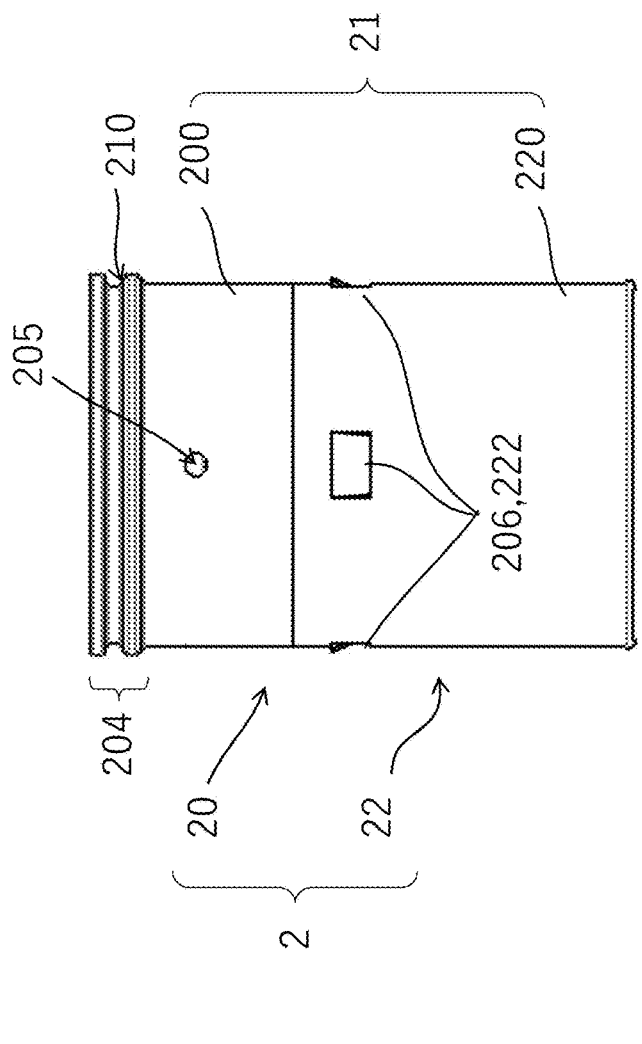
FIG. 3E is a right side view of the cartridge.
Figure 3F:
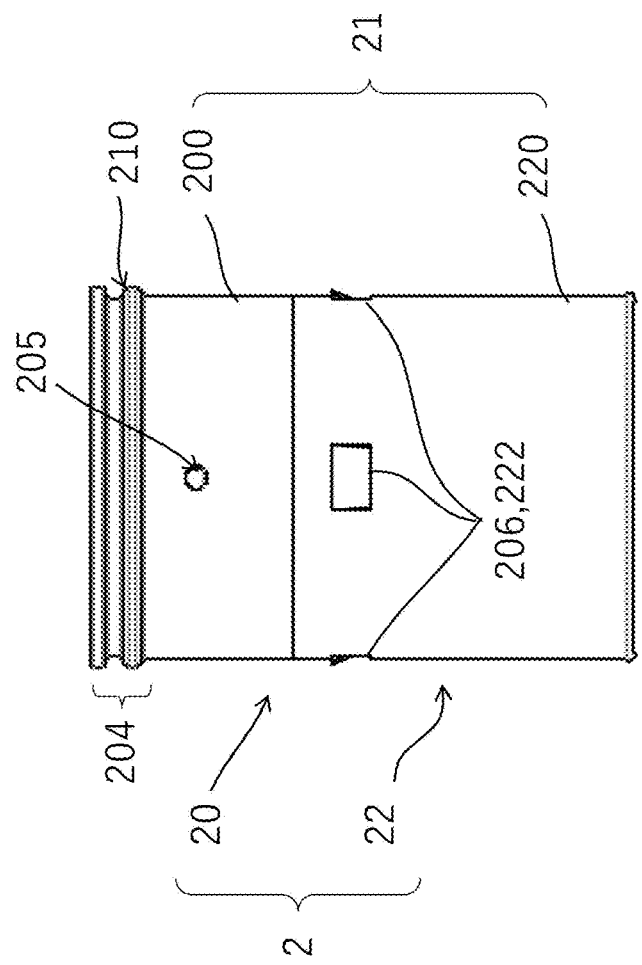
FIG. 3F is a left side view of the cartridge.

The second cover portion 22 has a bottom portion 227 and a side wall portion 220 that continuously rises from the bottom portion 227, and has a substantially cylindrical external appearance as a whole. As shown in FIG. 3D, a plurality of open holes 223a for purified water to be discharged to the outside of the cartridge 1 are formed at intervals in the circumferential direction in a peripheral portion of the bottom portion 227. The plurality of open holes 223a are collectively referred to as an outflow portion 223. As shown in FIG. 4, in the accommodated state, the open holes 223a are formed so as to be located generally immediately below the space 230 between the outer circumferential face 320 of the filter member 3 and the side wall portion 21 of the casing 2.

As shown in FIG. 4, a face 221 of the second cover portion 22 in the accommodated state can come into contact with the second face 33 of the filter member 3. Particularly, in the water purification cartridge according to the present invention, the filter member 3 is accommodated within the casing 2 in a state where the filter member 3 is elastically deformed by a pressing force of the first contact portion and the second contact portion, as will be described later, and thus, raw water that has flowed into the hollow portion 34 of the filter member 3 can be prevented from passing through a gap between the first face 31 and the first cover portion 20 and a gap between the second face 33 and the second cover 22, and the passage of raw water through the filter member 3 can be promoted, without an elastic member being provided between a molded water purification material and a casing and lid as in Patent Literature 1. Here, the face 221 is a face of the bottom portion 227 that opposes the internal space of the casing 2. A second protrusion 224, which protrudes from the face 221 toward the internal space of the casing 2 and has an annular shape, is formed in the face 221. In the accommodated state, the second protrusion 224 annularly comes into contact with the second face 33 of the filter member 3 so as to surround the circumference of the hollow portion 34 of the filter member 3, and presses the filter member 3 in the axial direction to elastically deform the filter member 3. In this case, the second protrusion 224 serves as the second contact portion that annularly comes into contact with the second face 33 of the filter member 3 so as to surround the circumference of the hollow portion 34, and presses the filter member 3 in the axial direction to elastically deform the filter member 3. In the water purification cartridge of the present invention, the face 221 may alternatively be a face that does not have a protrusion. For example, the face 221 may be flat. In this case, the face 221 serves as the second contact portion that annularly comes into contact with the second face 33 of the filter member 3 so as to surround the circumference of the hollow portion 34, and presses the filter member 3 in the axial direction to elastically deform the filter member 3. The cross-sectional shape of the second protrusion 224 is not specifically limited, but may be a substantially triangular shape, a substantially rectangular shape, a substantially semicircular shape, a substantially semi-oval shape, or the like. Corners of the substantially triangular shape and the substantially rectangular shape may be rounded.

The side wall portion 220 is formed to have a substantially cylindrical shape with generally the same diameter as that of the side wall portion 200 of the first cover portion 20. In an upper portion of the side wall portion 220, the same number of window portions 222, each of which is a substantially rectangular opening, as the claw portions 206 are formed at positions in the circumferential position that correspond to the claw portions 206. With this configuration, when the thin region R is inserted into the second cover portion 22 from above the second cover portion 22, and the claw portions 206 and the window portions 222 are engaged with each other in one-to-one correspondence, a connected state in which the first cover portion 20 and the second cover portion 22 are connected to each other can be achieved. In the connected state, the side wall portion 200 and the side wall portion 220 are generally flush with each other, and form the side wall portion 21 of the casing 2. Note that the second cover portion 22 can be removed from the first cover portion 20 by disengaging the window portions 222 and the claw portions 206 from each other. That is to say, the first cover portion 20 and the second cover portion 22 can be detachably connected to each other, and can also be connected to each other in an undetachable manner.

The material of the first cover portion 20 may be plastic. This plastic may be ABS resin (acrylonitrile butadiene styrene), PE (polyethylene), PP (polypropylene), AS resin (acrylonitrile styrene), PS (polystyrene), PET (polyethylene terephthalate), or PLA (polylactic acid) resin. Moe specifically, this plastic is selected from a group consisting of PP (polypropylene) and ABS resin (acrylonitrile butadiene styrene). The hardness of the first cover portion 20 is 95 to 100, which is higher than the later-described hardness of the filter member 3. Note that the hardness of ABS resin is 95, the hardness of PP is 100, and the hardness of PET is 97.

The material of the second cover portion 22 may be plastic. This plastic may be ABS resin (acrylonitrile butadiene styrene), PE (polyethylene), PP (polypropylene), AS resin (acrylonitrile styrene), PS (polystyrene), PET (polyethylene terephthalate), or PLA (polylactic acid) resin. More specifically, this plastic is selected from a group consisting of PP (polypropylene) and ABS resin (acrylonitrile butadiene styrene). The hardness of the second cover portion 22 is 95 to 100, which is higher than the later-described hardness of the filter member 3. Note that the hardness of ABS resin is 95, the hardness of PP is 100, and the hardness of PET is 97.

If the hardness of the first cover portion 20 is higher than the hardness of the filter member 3, and the hardness of the second cover portion 22 is higher than the hardness of the filter member 3, the first cover portion 20 and the second cover portion 22 may be made of the same material, or may be made of different materials. Note that measurement of the hardness in the present specification is conducted with a measurement device that is a hardness meter GS701G manufactured by TECLOCK using a method provided in JIS S 6050 "Plastic erasers", and an average value at N=5 is regarded as the hardness.

Figure 5B:
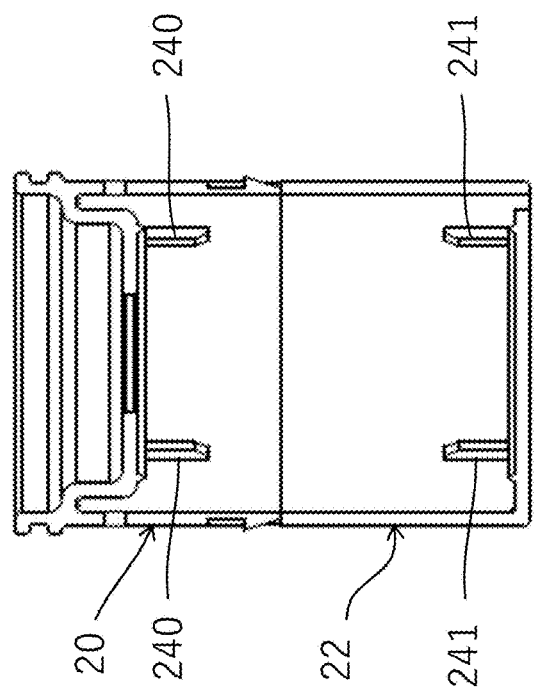
FIG. 5B is a cross-sectional view of FIG. 5A taken along a line B-B.
Figure 5A:
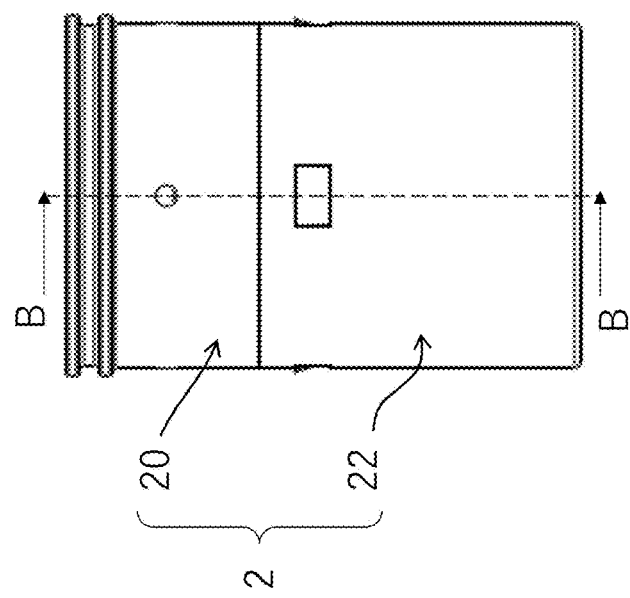
FIG. 5A is a right side view of the casing.
Figure 5D:
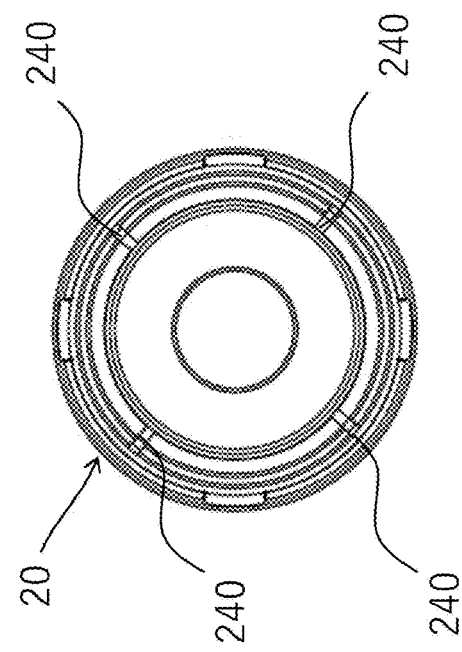
FIG. 5D is a cross-sectional view of FIG. 5C taken along a line D-D.
Figure 5C:
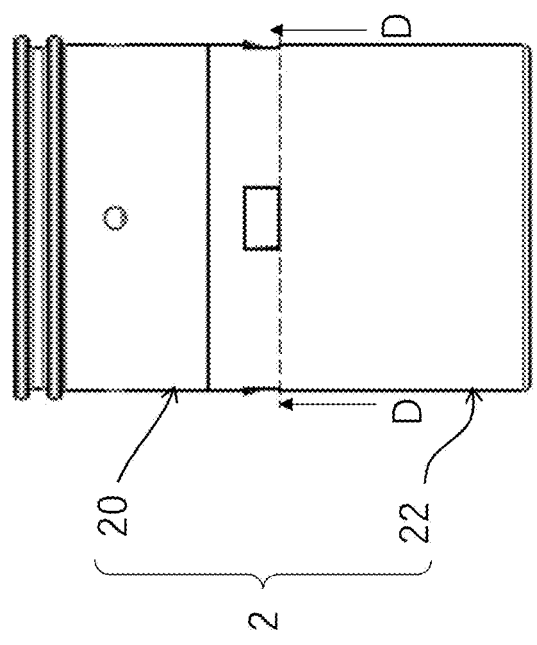
FIG. 5C is a right side view of the casing.

FIG. 5A is a right side view of the casing 2, and FIG. 5B is a cross-sectional view of FIG. 5A taken along a line B-B. FIG. 5C is a right side view of the casing 2, and FIG. 5D is a cross-sectional view of FIG. 5C taken along a line D-D. As illustrated in FIG. 5, at least one of the first cover portion 20 and the second cover portion 22 may have, on the inner wall face, ribs 240 or 241 for positioning the filter member 3. As shown in FIG. 5B, the ribs 240 that protrude toward the internal space of the casing 2 and extend in the vertical direction (the axial direction of the filter member 3) are formed on the inner wall face of the first cover portion 20. As shown in FIG. 5D, four ribs 240 are formed on the inner wall face of the first cover portion 20 and are arranged at generally equal intervals in the circumferential direction. Note that the ribs 240 shown in FIGS. 5B and 5D are merely an example. The positions at which the ribs 240 are formed, the shape of each rib 240, the number of ribs 240, and so on, are not limited to the mode shown in FIGS. 5B and 5D and can be changed as appropriate.

Figure 5F:
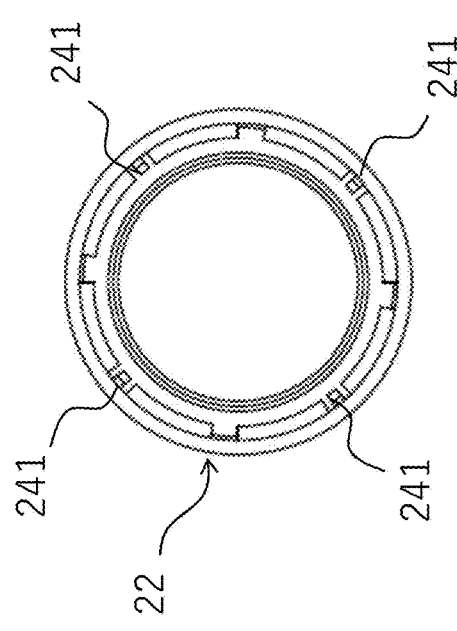
FIG. 5F is a cross-sectional view of FIG. 5E taken along a line F-F.
Figure 5G:
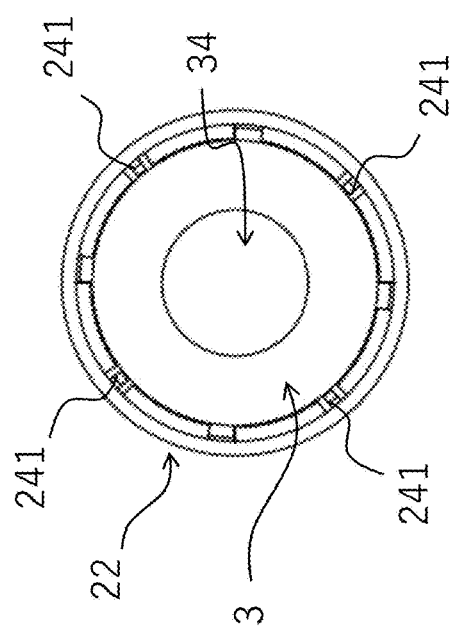
FIG. 5G is a cross-sectional view of FIG. 5E taken along a line F-F in an accommodated state.
Figure 5E:
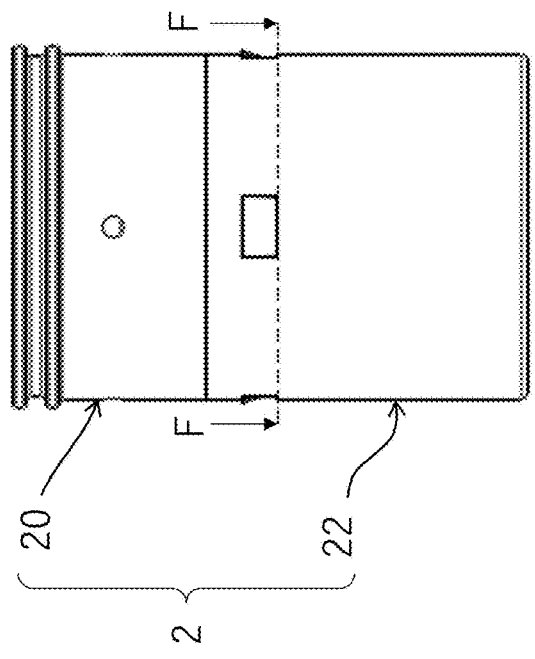
FIG. 5E is a right side view of the casing.

FIG. 5E is a right side view of the casing 2, and FIG. 5F is a cross-sectional view of FIG. 5E taken along a line F-F. As shown in FIG. 5B, the ribs 241 that protrude toward the internal space of the casing 2 and extend in the vertical direction (the axial direction of the filter member 3) are formed on the inner wall face of the second cover portion 22. As shown in FIG. 5F, four ribs 241 are formed on the inner wall face of the second cover portion 22 and are arranged at generally equal intervals in the circumferential direction. FIG. 5G is a cross-sectional view of FIG. 5E taken along in a line F-F in the accommodated state. As shown in FIG. 5G, the ribs 241 positions the filter member 3 such that the center of the filter member 3 is generally aligned with the center of the casing 2 in the accommodated state. Note that the ribs 241 shown in FIGS. 5B and 5F are merely an example. The positions at which the ribs 241 are formed, the shape of each rib 241, the number of ribs 241 and so on, are not limited to the mode shown in FIGS. 5B and 5F and can be changed as appropriate.

In the accommodated state, the ribs 240 and 241 position the filter member 3 such that the space 230 is formed between the outer circumferential face 320 of the filter member 3 and the side wall portion of the casing 2, and such that the center axis of the filter member 3 is generally aligned with the center axis of the casing 2. As a result of the filter member 3 being thus positioned at an appropriate position with respect to the casing 2, the relative positions of the hollow portion 34, the inflow portion 207, and the outflow portion 223 are appropriately maintained, and the space 230 for purified water is appropriate secured. With this configuration, water uniformly moves within the cartridge 1, and thus the efficiency of water purification is maintained.

The casing 2 may further have a first resisting portion that serves as a resistance against a flow of purified water that has flowed out to the space 230, between the outer circumferential face 320 of the filter member 3 and the outflow portion 223. The first resisting portion stops the flow of purified water that has flowed out of the filter member 3 when the pressure of the purified water flowing out of the filter member 3 weakens to some extent. As a result, purified water can be prevented from becoming droplets and dropping from the outflow portion 223.

Figure 7:
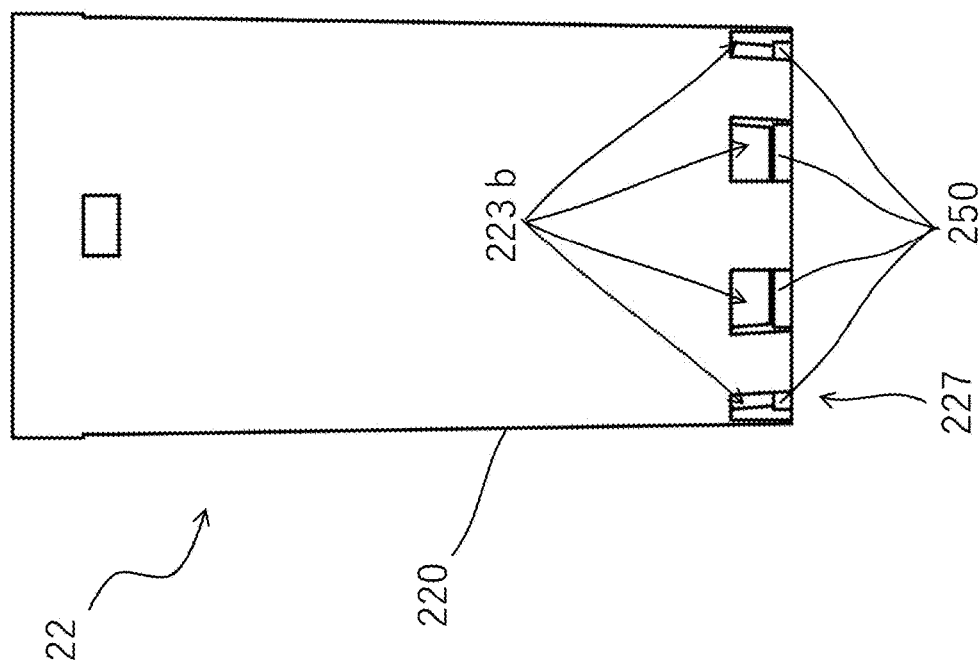
FIG. 7 is an external view of the casing that has a first resisting portion.

FIG. 7 shows an example of the first resisting portion. In the example shown in FIG. 7, a plurality of openings 223b, which constitutes the outflow portion 223, are formed at intervals in the circumferential direction at a lower portion of the second cover portion 22. The openings 223b are open laterally and downward of the second cover portion 22. Ribs 250, which protrude upward from the face 221, are formed in correspondence with the positions in the circumferential direction of the openings 223b, at a peripheral portion of the bottom portion 227.

Figure 8:
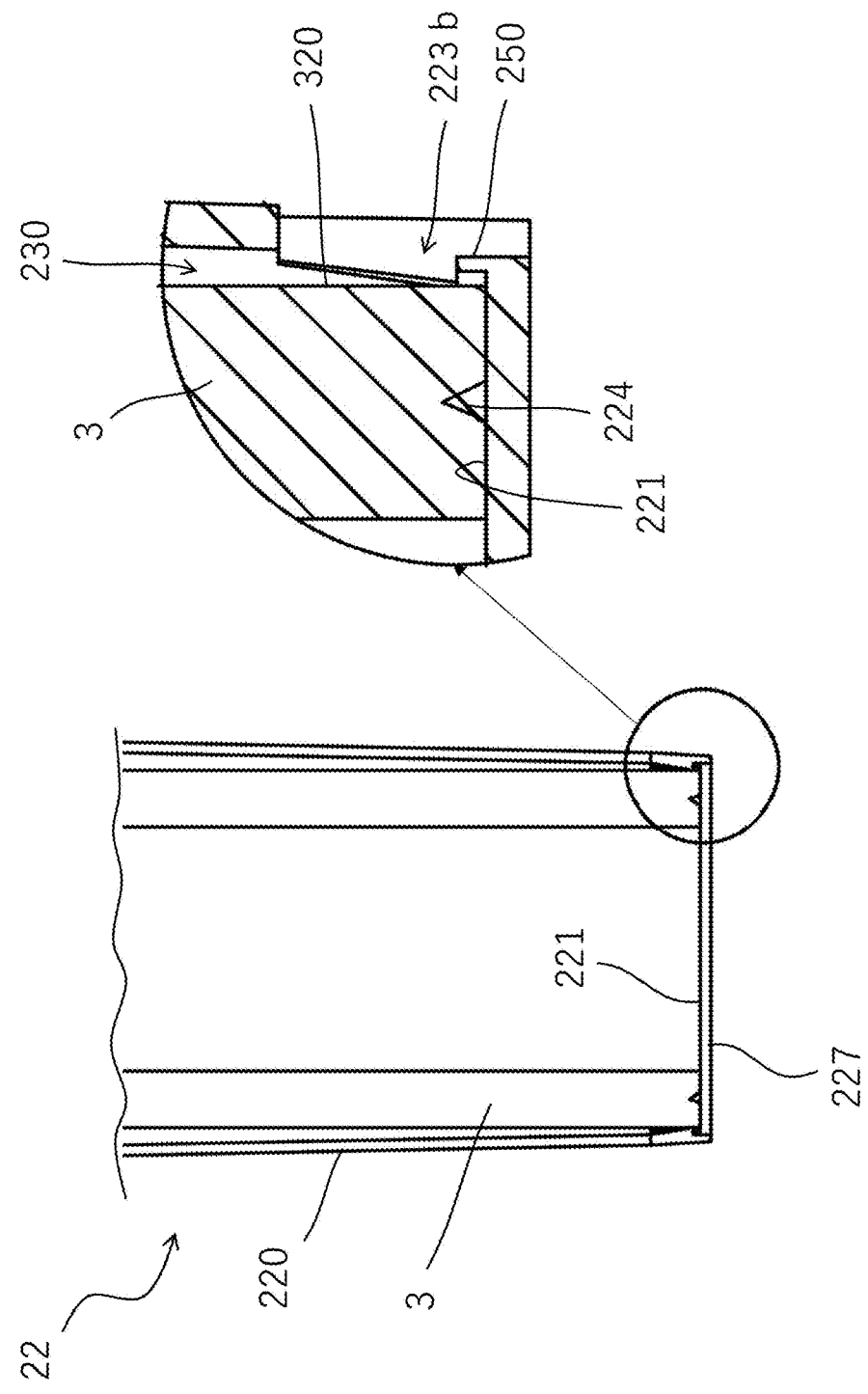
FIG. 8 is a cross-sectional view illustrating a configuration of an area around the first resisting portion in FIG. 7.

FIG. 8 is an enlarged cross-sectional view of an area around a rib 250. As shown in FIG. 8, each rib 250 is located outward, in the radial direction, of the outer circumferential face 320 of the filter member 3, and is configured to close a lower portion of the corresponding opening 223b from the inner side thereof in the radial direction. Thus, each rib 250 functions as the first resisting portion.

The maximum height of the ribs 250 based on the face 221 of the bottom portion 227 that serves as a reference can be set as appropriate in accordance with the filtering capacity of the filter member 3, for example. The maximum height of the ribs 250 is preferably a height that does not affect at all, or hardly affects, the overall flow of water if the pressure of purified water is greater than or equal to a certain pressure, and with which an outflow of purified water can be stopped if the pressure of the purified water is such that the purified water drips from the outflow portion 223.

Furthermore, a plurality of ribs 250 may be formed in the circumferential direction of the casing 2 to also serve as ribs for positioning the filter member 3. That is to say, the ribs 250 may also have the function of at least either the ribs 240 or the ribs 241 for positioning the filter member 3, and thus the ribs 240 or the ribs 241 may be omitted.

<3. Filter Member>

As mentioned above, the filter member 3 is a member for filtering raw water that has flowed into the hollow portion 34 by letting the raw water pass through the side circumferential portion 32 outward in the radial direction and making the raw water into purified water. The filter member 3 has the first face 31 and the second face 33 at respective ends in the axial direction. The filter member 3 is made of an elastic material. For this reason, the filter member 3 can come into intimate contact with harder objects, such as the first cover portion 20 and the second cover portion 22.

A distance L1 (see FIG. 2) between the first face 31 and the second face 33 in a state before the filter member 3 is accommodated in the casing (i.e., in a state before the filter member 3 is pressed in the axial direction and elastically deformed) is longer than a distance L3 between a leading end portion 209 of the first protrusion 208 and a leading end portion 225 of the second protrusion 224 in the connected state (i.e., the distance L3 between the first contact portion and the second contact portion; see FIG. 4). Thus, at the first face 31 of the filter member 3 in the accommodated state, the first protrusion 208 pierces and engages with a region outward, in the radial direction, of the hollow portion 34, a force that compresses the filter member 3 in the axial direction is applied to the filter member 3, and a gap between the first face 31 and the face 203 of the first cover portion 20 is shut. Similarly, in the second face 33 of the filter member 3 in the accommodated state, the second protrusion 224 pierces and engages with a region outward, in the radial direction, of the hollow portion 34, a force that compresses the filter member 3 in the axial direction is applied to the filter member 3, and a gap between the second face 33 and the face 221 of the second cover portion 22 is shut. With this configuration, the passage of water via the two end faces of the filter member 3 is suppressed, and raw water in the hollow portion 34 and purified water in the space 230 are separated from each other.

That is to say, the first protrusion 208, which is the first contact portion, annularly comes into contact with the first face 31 of the filter member 3 so as to surround the outer circumferential face of the hollow portion 34 and presses the filter member 3 in the axial direction to elastically deform the filter member 3, and the second protrusion 224, which is the second contact portion, annularly comes into contact with the second face 33 of the filter member 3 so as to surround the circumference of the hollow portion 34 and presses the filter member 3 in the axial direction to elastically deform the filter member 3. With this configuration, it is possible to prevent raw water that has flowed into the hollow portion of the filter member from passing through a gap between the first face 31 and the first cover portion and a gap between the second face 33 and the second cover portion, and to promote the passage of raw water through the filter member 3, without an elastic member being provided between a molded water purification material and a casing and lid as in the water purification cartridge described in Patent Literature 1.

The compression ratio (L3/L1×100(%)) of the length L1 of the filter member 3 between the contact portions in the accommodated state is preferably 98% or less, more preferably 96 to 98%, and more preferably 97 to 98%. When the compression ratio (L3/L1×100(%)) of the filter member 3 in the accommodated state is in the above range, the proportion (L2/L1×100(%)) of the distance L2 to the length L1 of the filter member 3 is, for example, 98% or more, preferably 98 to 101%, and more preferably 99 to 101%, from the viewpoint of reducing the area of contact portions and readily increasing the pressure that presses the filter member 3 in the axial direction and elastically deforms the filter member 3 in the accommodated state.

From the viewpoint of more reliably blocking the passage of water, it is preferable that a sealant is applied to at least one of the first face 31 of the filter member and the second face 33 of the filter member. It is more preferable that a sealant is applied to both the first face 31 and the second face 33 of the filter member. In the present embodiment, a hot melt adhesive is applied as a sealant to the first face 31 and the second face 33. The main component of the hot melt adhesive is, for example, ethylene vinyl acetate (EVA), olefin, rubber, or the like. The application thickness of the sealant is 10 μm to 1000 μm, and the amount of sealant is 1 to 100 (mg/cm$^2$), for example. Note that the sealant can be applied in advance and solidified before the filter member 3 is accommodated in the casing 2.

Figure 6:
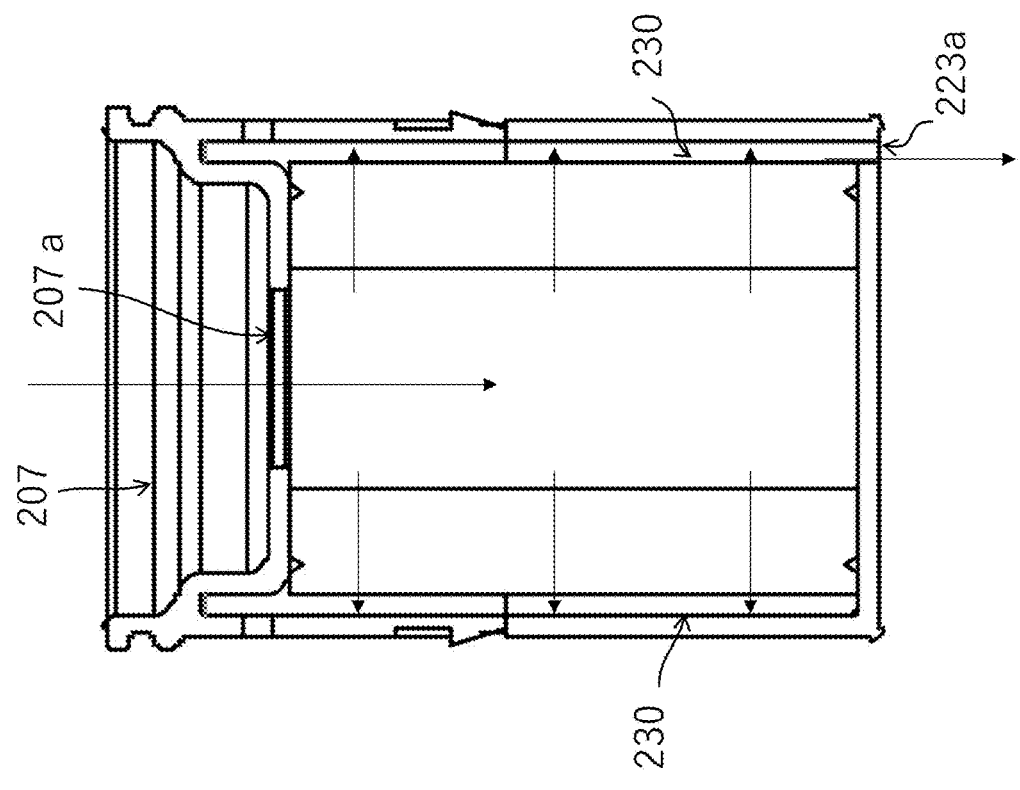
FIG. 6 is a cross-sectional view illustrating a flow of water within the in-out type cartridge.

Main streams of water that passes within the cartridge 1 are indicated by arrows shown in FIG. 6. At first, raw water flows into the cartridge 1 via the inflow portion 207 of the first cover portion 20. The raw water that flows into the cartridge 1 flows into the hollow portion 34 and is temporarily stored. Here, the first protrusion 208 and the second protrusion 224 engage, respectively, with an upper peripheral edge and a lower peripheral edge of the hollow portion 34, and presses the filter member 3 in the axial direction to elastically deform the filter member 3. For this reason, the raw water does not flow out to the space 230 via the first face 31 and the second face 33. The raw water stored in the hollow portion 34 passes outward in the radial direction through the side circumferential portion 32, and flows out, as purified water, to the space 230. Subsequently, the purified water is discharged from the space 230 to the outside of the cartridge 1 via the outflow portion 223.

The filter member 3 is made of a material that contains fibrous activated carbon, and is elastic. The hardness of the filter member 3 is lower than the hardness of the casing 2, that is, the hardness of the first cover portion 20 and the hardness of the second cover portion 22. The hardness of the filter member 3 is preferably 86 or less, and more preferably about 65 to 80. Note that the hardness measurement is conducted using the method provided in JIS S 6050 "Plastic erasers", and an average value at N=5 is regarded as the hardness.

<4. Method for Manufacturing Filter Member>

Figure 12:
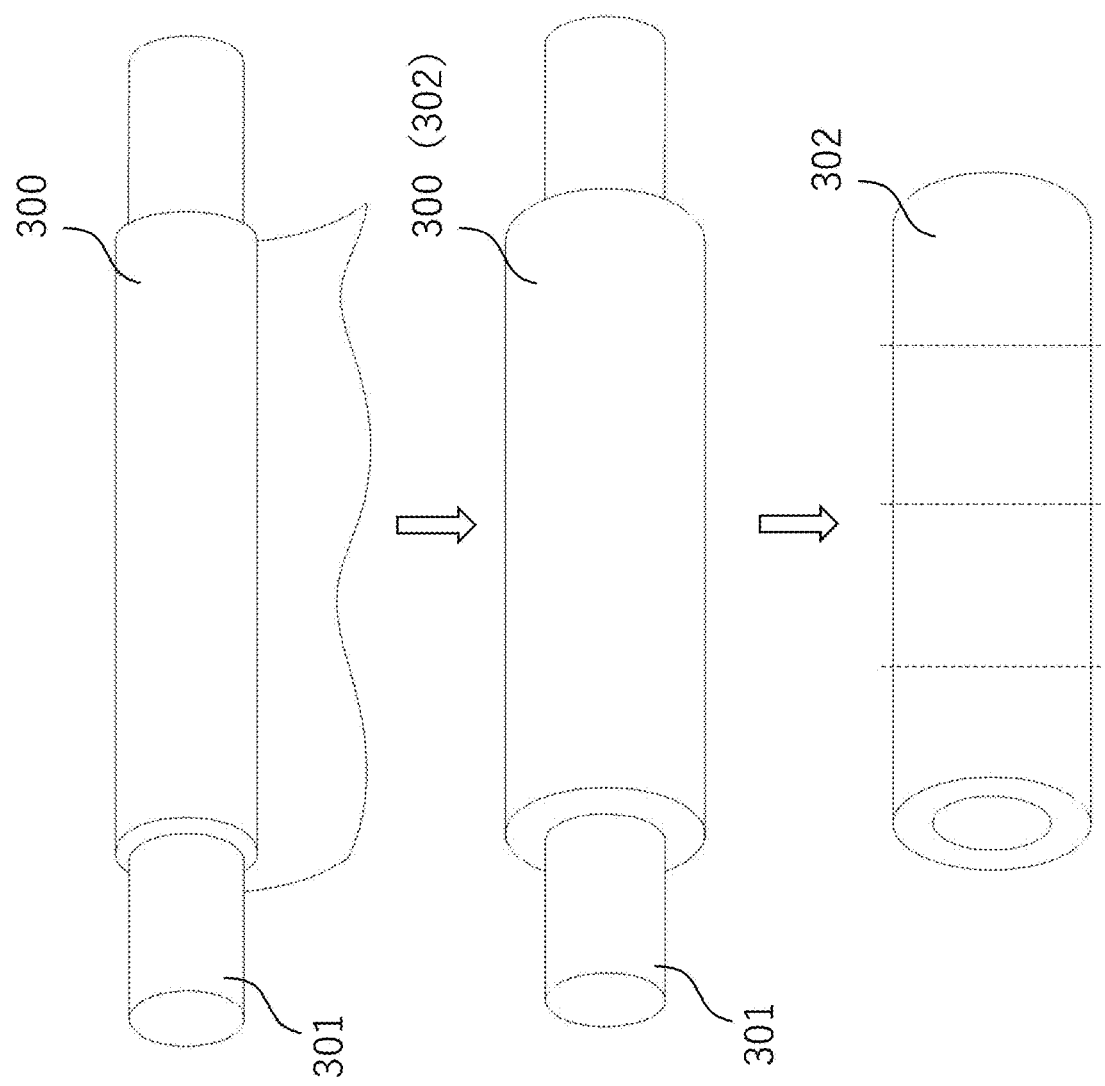
FIG. 12 is a diagram illustrating a method for manufacturing the filter member.

In the present embodiment, the filter member 3 is manufactured from a sheet 300, which is made of a mixture of fibrous activated carbon and thermally bonded fiber. As shown in FIG. 12, the sheet 300 is wound around a core 301 until a predetermined thickness is reached. As a result of the core 301 around which the sheet 300 is wound being put into a furnace and heat-treated, the laminated sheet layers are integrated with each other, and a cylindrical intermediate molded body 302 wound around the core 301 is formed. The filter member 3 can be obtained by removing this intermediate molded body 302 from the core 301 and cutting the intermediate molded body 302 at a predetermined length. Here, the aforementioned hot melt adhesive may be applied to at least one of the first face 31 and the second face 33 of the filter member 3 obtained by cutting the intermediate molded body 302.

The thermally bonded fiber contained in the sheet 300 is preferably thermally bonded fiber that is made of polymers of two or more components with different melting points or softening points. Particularly, it is preferable to use fiber that has a core sheath structure in which a high-melting point polymer is a core component and a low-melting point polymer is a sheath component, in terms of ease of heat treatment. More specifically, examples of the fiber include polyolefin fibers with a polypropylene core and a modified polyethylene sheath, fibers with a polyethylene terephthalate core and a polyolefin sheath, and polyester fibers with a polyethylene terephthalate core and a low-melting-point polyester sheath.

<5. Characteristics>

When the cartridge 1 is manufactured, the distance (the length of the filter member 3) L1 between the first face 31 and the second face 33 of the filter member 3 is in the aforementioned range with respect to the distance L2 between the face 203 of the first cover portion 20 and the face 221 of the second cover portion 22 in the connected state. Further, the length L1 of the filter member 3 is longer than the distance L3 between the leading end portion 209 of the first protrusion 208 and the leading end portion 225 of the second protrusion 224 in the connected state. With this configuration, at the first face 31 of the filter member 3 in the accommodated state, the first protrusion 208 pierces and engages with a region outward, in the radial direction, of the hollow portion 34, a force that compresses the filter member 3 in the axial direction is applied to the filter member 3, and a gap between the first face 31 and the face 203 of the first cover portion is shut. Similarly, in the second face 33 of the filter member 3 in the accommodated state, the second protrusion 224 pierces and engages with a region outward, in the radial direction, of the hollow portion 34, a force that compresses the filter member 3 in the axial direction is applied to the filter member 3, and a gap between the second face 33 and the face 221 of the second cover portion 22 is shut. With this configuration, the passage of water via the two end faces of the filter member 3 is suppressed, and raw water in the hollow portion 34 and purified water in the space 230 are separated from each other.

Furthermore, as a result of a sealant being applied to the first face 31 and the second face 33 themselves, raw water that has flowed into the cartridge 1 can be more reliably inhibited from flowing into the space 230 via the first face 31 and the second face 33 of the filter member 3, and the aforementioned effect can be further enhanced.

The filter member 3 is elastic due to containing fibrous activated carbon. With this configuration, the filter member 3 is unlikely to collapse even if a force that compresses the filter member 3 in the vertical direction is applied thereto via the first cover portion 20 and the second cover portion 22, and there is little possibility that fragments are formed. That is to say, there is little possibility that water in the cartridge 1 is contaminated, and thus the quality of purified water is maintained. Further, since the filter member 3 is elastic, the filter member 3 can be deformed in accordance with the shapes of the protrusions 208 and 224 when the protrusions 208 and 224 of the first cover portion 20 and the second cover portion 22 engage with the filter member 3. That is to say, the protrusions 208 and 224 and the filter member 3 can be brought into intimate contact with each other. With this configuration, the aforementioned effect of shutting out raw water can be further improved.

In contrast, for example, a filter member that does not contain fibrous activated carbon but is made only of granular activated carbon is not elastically deformed by a pressing force of the first contact portion and the second contact portion. If pressing force is forcibly applied to such a filter member, the granular activated carbon partially collapses, and there is possibility that the filter member no longer functions. Further, repulsive force is not generated even if a pressing force is applied, and the two end faces of the filter member do not come into intimate contact with the first and second cover portions. For this reason, to prevent raw water that has flowed into the hollow portion of the filter member from passing through a gap between the first face and the first cover portion and a gap between the second face and the second cover portion, an elastic member for sealing these gaps is separately needed.

Compared with an out-in type cartridge that has a filter member 3 with the same configuration, the in-out type cartridge 1 has a characteristic that the water filtration rate is fast. In addition, since it is not necessary to ensure liquid tightness at the outer circumferential face of the casing 2, the first cover portion 20 and the second cover portion 22 can be configured in a detachable manner, and an operation to replace the filter member 3 can be easily performed.

If the cartridge 1 has the first resisting portion such as the ribs 250, when the pressure of purified water flowing out from the filter member 3 weakens to a certain degree, purified water that has flowed out into the space 230 is stopped by the first resisting portion. Since the stopped purified water remains within the casing 2, the purified water is unlikely to become droplets and drip from the outflow portion 223. Thus, the cartridge 1 can give a user an impression that the cartridge 1 is watertight and has a short filtration time.

B. Second Embodiment

Figure 9:
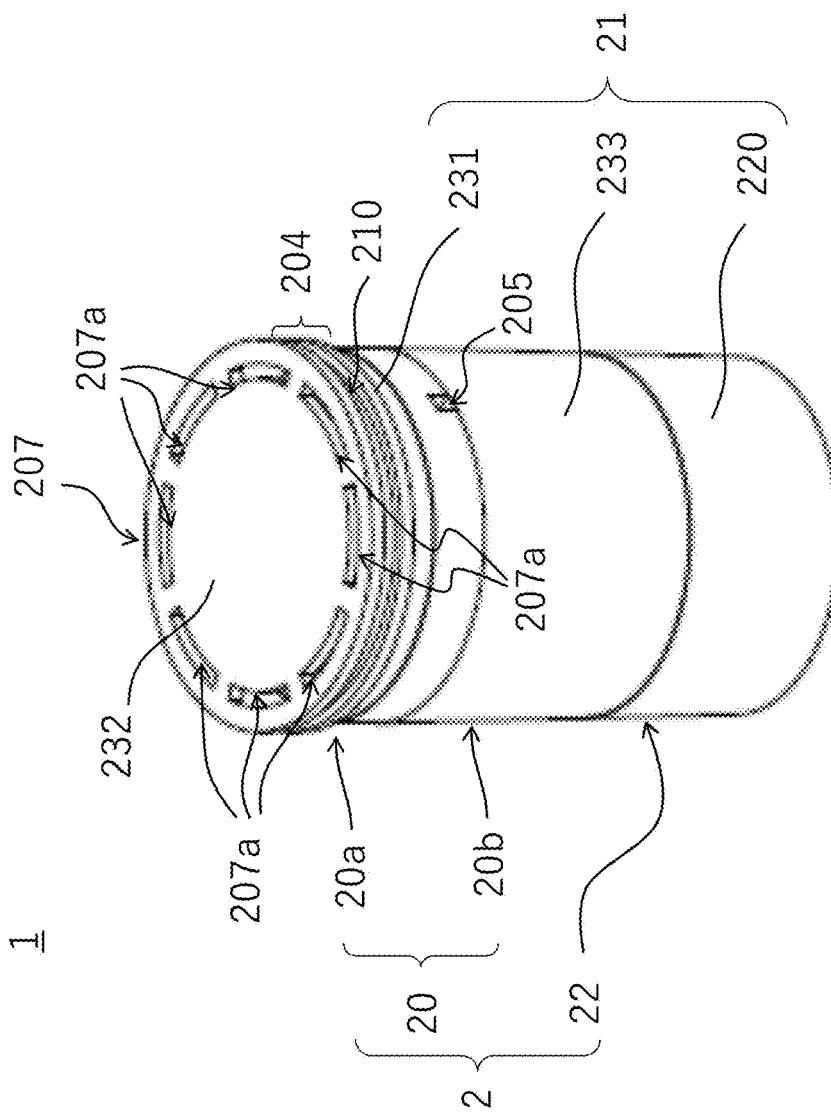
FIG. 9 is an external perspective view of an out-in type cartridge.
Figure 10:
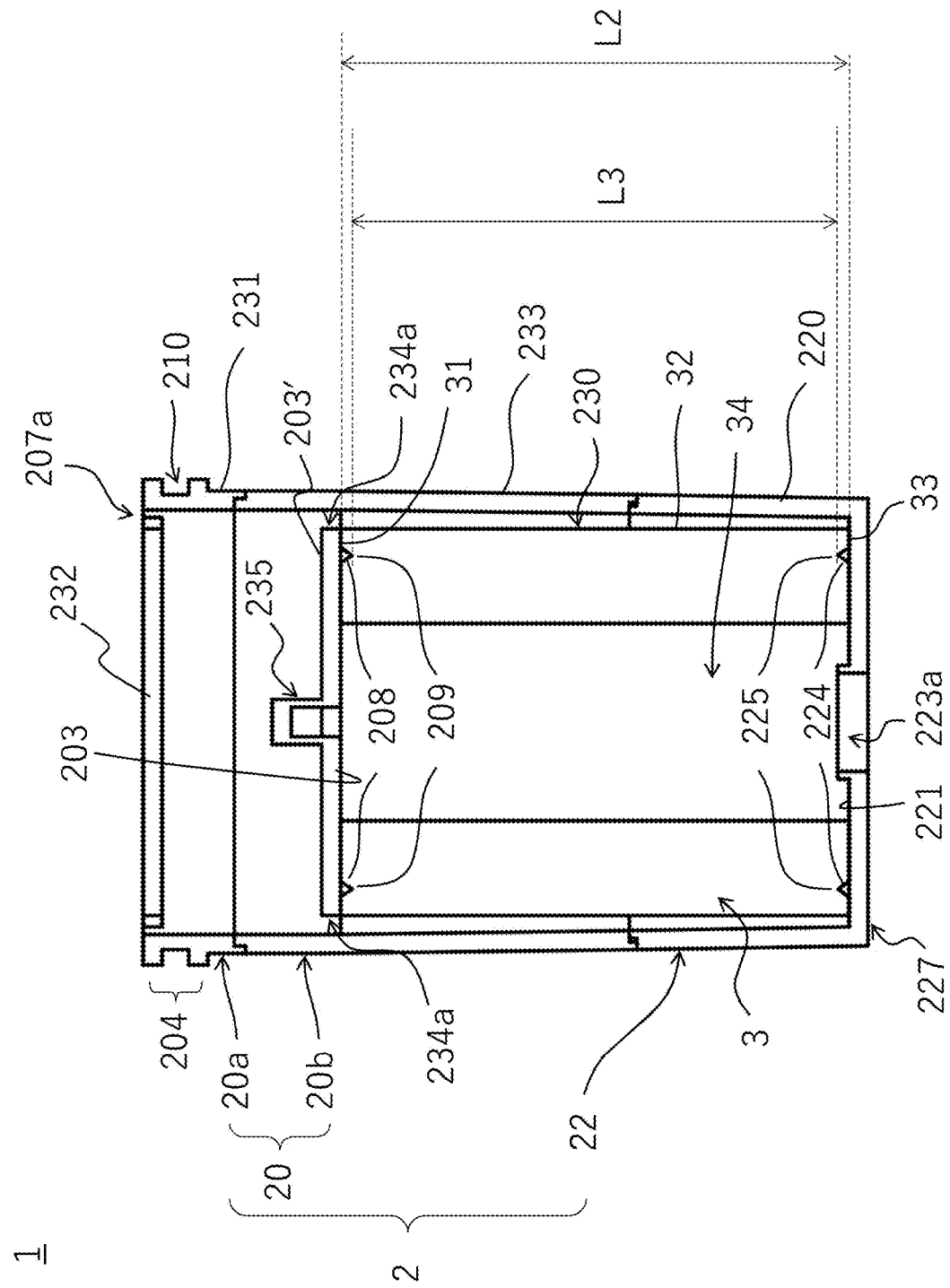
FIG. 10 is a cross-sectional view of the out-in type cartridge.

A second embodiment of a water purification cartridge according to the present invention will be described below with reference to the diagrams. FIG. 9 is an external perspective view of a water purification cartridge (which may be hereinafter referred to simply as a cartridge) 1 according to the present embodiment, and FIG. 10 is a cross-sectional view. In the following, for convenience of description, the vertical direction in FIG. 10 is referred to as "above (up, upper etc.)/below (down, lower etc.)", the left-right direction in FIG. 10 is referred to as "left/right" or "horizontal", and the paper plane direction in FIG. 10 is referred to as "front/back", and the description is given based on these directions.

The water purification cartridge according to the second embodiment differs from the first embodiment in the configuration of a casing 2. More specifically, the cartridge 1 of the present embodiment is an out-in type cartridge in which raw water that has flowed into a gap between a side wall portion of the casing 2 and an outer-circumferential face 320 of a filter member 3 passes through the filter member 3 inward in the radial direction, and flows out, as purified water, from the hollow portion of the filter member 3. In the following, the same constituent elements are assigned the same reference signs, and a description thereof is omitted.

<1. Casing>

The casing 2 includes a first cover portion that covers a first face 31 of the filter member 3, a second cover portion that covers a second face 33 of the filter member 3, and a side wall portion that covers the outer circumferential face 320 of the filter member 3. In the present embodiment, as shown in FIG. 9, the casing 2 is configured by connecting the first cover portion 20, which covers the first face 31 of the filter member 3, and the second cover portion 22, which covers the second face 33 of the filter member 3, are connected to each other, and the side wall portion 21 is constituted by a side wall portion of the first cover portion 20 and a side wall portion of the second cover portion 22 that will be described later. In the following, a state where the second cover portion 22 is connected to the first cover portion 20 is referred to as a connected state. In the connected state, a space for accommodating the filter member 3 is formed within the casing 2.

Figure 13B:
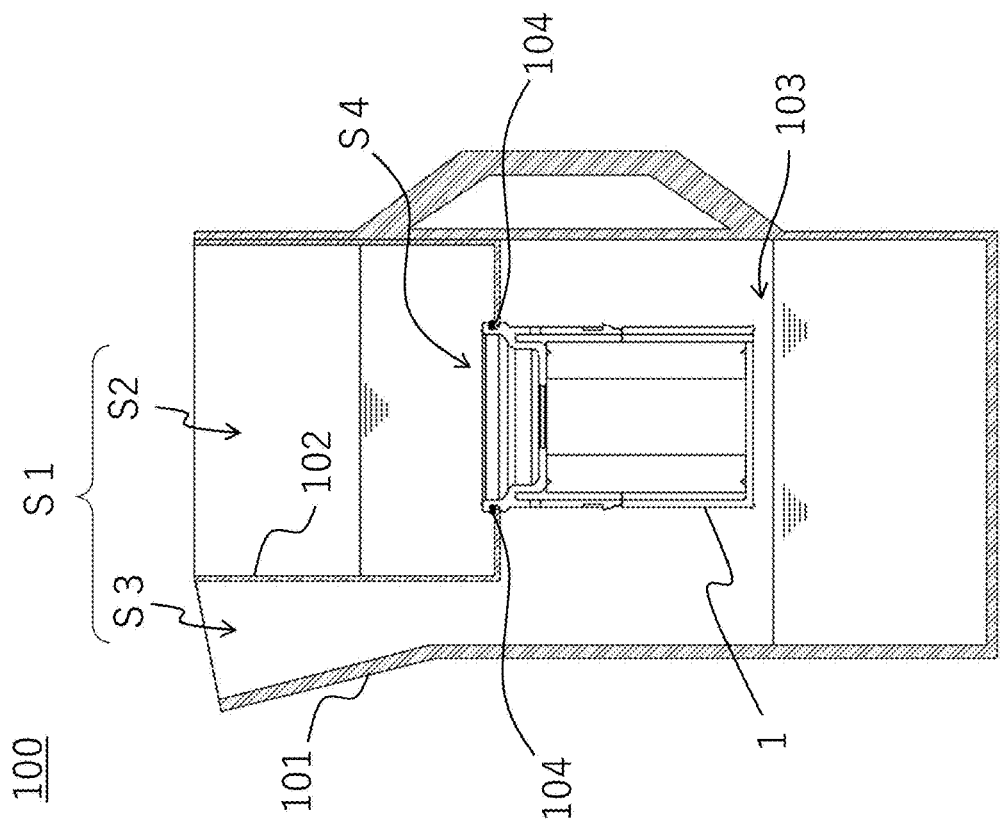
FIG. 13B is a cross-sectional schematic diagram of a pot-type water purifier that uses the out-in type cartridge.

The first cover portion 20 is constituted by parts that are an upper cover portion 20a and a lower cover portion 20b that is integrally connected to a lower end of the upper cover portion 20a. As shown in FIG. 10, the upper cover portion 20a has a side wall portion 231 that has a substantially cylindrical shape, and an upper face portion 232 that is continuous with the side wall portion 231 and has a substantially circular shape. A plurality of open holes 207a for raw water to flow into the cartridge 1 are formed at intervals in the circumferential direction in a peripheral portion of the upper face portion 232, and an inflow portion 207 in which the plurality of open holes 207a are annularly arranged is formed as a whole. A flange 204 for the cartridge 1 to be attached to a peripheral portion of an opening S4 of a water purifier is formed at an upper outer portion of the side wall portion 231. A groove 210 to which a packing 104 is fitted is formed at the center in the vertical direction of the flange 204. FIG. 13B shows an example of the water purifier. A water purifier 100 shown in FIG. 13B is the same as that shown in FIG. 13A except for the configuration of the cartridge 1, and therefore a description of the water purifier 100 is omitted.

The lower cover portion 20b has a side wall portion 233 that has a substantially cylindrical shape, and a face portion 203' that is formed within the side wall portion 233 and has a substantially circular shape. As shown in FIG. 10, a plurality of open holes 234a are formed in a peripheral portion of the face portion 203' at intervals in the circumferential direction at positions corresponding to the open holes 207a that form the inflow portion 207, and bring the inside and the outside of the casing 2 into communication with each other. A face of the face portion 203' that opposes the internal space of the casing 2 is referred to as a face 203. A first protrusion 208 that has an annular shape is formed on the face 203 so as to be surrounded by the plurality of open holes 234a. That is to say, the first protrusion 208 is formed inward, in the radial direction, of the open holes 207a. In the accommodated state, the first protrusion 208 annularly comes into contact with the first face 31 of the filter member 3 so as to surround the hollow portion 34 of the filter member 3, and presses the filter member 3 in the axial direction to elastically deform the filter member 3. In this case, the first protrusion 208 serves as the first contact portion that annularly comes into contact with the first face 31 of the filter member 3 so as to surround the circumference of the hollow portion 34 and presses the filter member 3 in the axial direction to elastically deform the filter member 3. In the water purification cartridge of the present invention, the face 203 may alternatively be a face that does not have a protrusion. For example, the face 203 may be flat. In this case, the face 203 serves as the first contact portion that annularly comes into contact with the first face 31 of the filter member 3 so as to surround the circumference of the hollow portion 34 and presses the filter member 3 in the axial direction to elastically deform the filter member 3. The cross-sectional shape of the first protrusion 208 is not specifically limited, but may be a substantially triangular shape, a substantially rectangular shape, a substantially semicircular shape, a substantially semi-oval shape, or the like. Corners of the substantially triangular shape and the substantially rectangular shape may be rounded.

A ventilation path 235, which extends in the front-back direction and has a rectangular cross-section, is formed in the face portion 203' on the side opposing the upper face portion 232. The ventilation path 235 is in communication with vents 205 that are formed in the side wall portion 233 and have a rectangular cross-section. The ventilation path 235 is defined by two side faces that rise from the face portion 203' and are substantially parallel, and an upper face that is continuous with the two side faces, and is therefore isolated from the flow path of water that passes within the cartridge 1.

The second cover portion 22 has a bottom portion 227 and a side wall portion 220 that continuously rises from the bottom portion 227, and has a substantially cylindrical external appearance as a whole. The side wall portion 220 is formed to have a substantially cylindrical shape with generally the same diameter as that of the side wall portion 231 and the side wall portion 233. An outflow portion 223 for purified water to flow out of the cartridge 1 is formed at a center portion of the bottom portion 227. The outflow portion 223 of the present embodiment is constituted by a circular open hole 223a. A face of the bottom portion 227 that opposes the internal space of the casing 2 is referred to as a face 221. In the face 221, a second protrusion 224 that has an annular shape is formed at a position outward, in the radial direction, of the outflow portion 223 so as to surround the outflow portion 223.

The casing 2 may also have a second resisting portion that serves as a resistance against a flow of purified water between the hollow portion 34 of the filter member 3 and the outflow portion 223. The second resisting portion in the present embodiment is a rib 251 (see FIG. 11) that rises from the face 221. The rib 251 of the present embodiment has an annular shape as viewed from above, and defines the open hole 223a on the inner side in the radial direction of the hollow portion 34. The rib 251 is stops purified water from flowing out from the open hole 223a when the pressure of purified water flowing out to the hollow portion 34 weakens to a certain degree. As a result, purified water can be prevented from becoming droplets and dropping from the outflow portion 223.

The maximum height of the rib 251 based on the face 221 serving as a reference can be set as appropriate in accordance with the filtering capacity of the filter member 3, for example. The maximum height of the ribs 251 is preferably a height that does not affect at all, or hardly affects, an overall flow of water if the pressure of purified water is greater than or equal to a certain pressure, and with which an outflow of purified water can be stopped if the pressure of the purified water is such that the purified water drips from the outflow portion 223.

In the present embodiment, the upper cover portion 20a and the lower cover portion 20b are connected to each other, and the first cover portion 20 is connected to the second cover portion 22, such that these connecting portions keep liquid tightness. As shown in FIG. 9, in the connected state where the first cover portion 20 and the second cover portion 22 are connected to each other, the side wall portion 231, the side wall portion 233, and the side wall portion 220 are generally flush with each other and form the side wall portion 21 of the casing 2. Ultrasonic bonding or the like is used to connect the upper cover portion 20a and the lower cover portion 20b to each other and connect the first cover portion 20 and the second cover portion 22 to each other.

In the accommodated state, the outer diameter of the filter member 3 is slightly smaller than the inner diameter of the side wall portion 21 of the casing 2. Thus, in the accommodated state, an annular space 230 is formed in a gap between the side circumferential portion 32 and the side wall of the casing 2 similarly to the first embodiment.

A flow path of water that passes through the cartridge 1 will be described more specifically below. Main streams of water within the cartridge 1 are indicated by arrows shown in FIG. 11. At first, raw water flows from the tank 102 into the cartridge 1 via the inflow portion 207, that is, the first cover portion 20. The raw water that flows in from the inflow portion 207 passes through the open holes 234a and is temporarily stored in the space 230. The raw water stored in the space 230 passes inward in the radial direction through the side circumferential portion 32 of the filter member 3, and flows, as purified water, into the hollow portion 34. The purified water that flows into the hollow portion 34 is discharged from the outflow portion 223 to the outside of the cartridge 1.

<2. Characteristics>

The configurations of the filter member 3, the face 203, the face 221, the first protrusion 208, and the second protrusion 224 of the second embodiment are the same as those of the first embodiment. Accordingly, the characteristics achieved by the configurations thereof are as described in the description of the first embodiment. Characteristics unique to the second embodiment are described below.

In the cartridge 1 of the second embodiment, water is filtered inward in the radial direction through the side circumferential portion 32 of the filter member 3. For this reason, another type of filter, such as a hollow fiber membrane, can be further arranged in the hollow portion 34, which is an area in which purified water is present. By arranging another type of filter in the hollow portion 34, a compact water purification cartridge with higher filtering performance can be provided without increasing the volume of the cartridge 1.

If the cartridge 1 has the second resisting portion such as the rib 251, purified water that has flowed into the hollow portion 34 is stopped by the second resisting portion when the pressure of purified water flowing out from the filter member 3 weakens to a certain degree. Since the stopped purified water remains within the casing 2, the purified water is unlikely to become droplets and drip from the outflow portion 223. Thus, the cartridge 1 can give a user an impression that the cartridge 1 is watertight and has a short filtration time.

C. Variations

Although the embodiments of the present invention have been described so far, the present invention is not limited to the above embodiments, and various modifications may be made without departing from the gist of the present invention. For example, the following modifications may be made. The gist of the following modifications may be combined as appropriate.

<1>

Although the cartridge 1 of the above embodiments is mainly attached to a pot-type water purifier when used, the present invention is not limited thereto, and the cartridge 1 can also be applied to a water purifier of a type that is attached to a water faucet portion or the like when used, for example.

<2>

In the above embodiments, the filter member 3 is manufactured from a sheet that is made of a mixture of fibrous activated carbon and thermally bonded fiber, but the method for manufacturing the filter member 3 is not limited thereto. For example, the elastic filter member 3 can alternatively be manufactured by means of a wet molding method. In the wet molding method, for example, granular activated carbon and a pre-beaten fibrous binder (pulp) are mixed in water. The thus-obtained slurry is suctioned into a mold that has a substantially cylindrical cavity and is molded into the shape of the filter member 3. Subsequently, by drying a molded product removed from the mold, the filter member 3 that is a molded body can be manufactured. In the wet molding method, the hardness of the filter member 3 can be adjusted using the blending ratio of the pulp used as a binder. In this method, a filter member with a hardness of about 77 can be formed, for example.

<3>

In the above embodiments, the vents 205 are formed in the side face of the casing 2, but the formation of the vents 205 can be omitted.

<4>

The modes of the inflow portion 207 and the outflow portion 223 are not limited to the modes described in the above embodiments. For example, the numbers of open holes 207a and open holes 223a and the shapes thereof can be changed as appropriate. For example, the inflow portion 207 in the first embodiment does not need to be formed to have a flat-bottomed container shape that is recessed downward, and may alternatively be formed to have a flat shape as a whole, or a cylindrical shape that protrudes upward. The open holes 223a in the first embodiment may be formed on the lower side of the side wall portion 220 rather than in the bottom portion 227. For example, the inflow portion 207 in the second embodiment is formed in the upper face portion 232 and is flat as a whole, but may alternatively be formed in a flat-bottomed container shape that is recessed downward from the upper face portion 232, or may contrarily be formed to protrude upward. Furthermore, the outflow portion 223 in the second embodiment may be formed to have a cylindrical shape that protrudes downward from the bottom portion 227, for example.

<5>

In the first embodiment, the first cover portion 20 and the second cover portion 22 can be detached from each other, but the first cover portion 20 and the second cover portion 22 can alternatively be configured to not be able to be detached from each other. Various connection mechanisms other than the engagement between the claw portions 206 and the window portions 222 can be employed as the connection mechanism for connecting the first cover portion 20 and the second cover portion 22. Further, the shapes of the first cover portion 20 and the second cover portion 22 are not limited to the above-described shapes. The shapes of the first cover portion 20 and the second cover portion 22 can be changed as appropriate as long as the first cover portion 20 has the first contact portion that comes into contact with the first face 31 of the filter member 3 and presses the filter member 3 in the axial direction to elastically deform the filter member 3, and the second cover portion 22 has the second contact portion that comes into contact with the second face 33 of the filter member 3 and presses the filter member 3 in the axial direction to elastically deform the filter member 3. For example, the second cover portion 22 does not need to have the side wall portion 220, and may only have the bottom portion 227.

<6>

In the second embodiment, the first cover portion 20 is constituted by the upper cover portion 20a and the lower cover portion 20b, but the method for forming the first cover portion 20 is not limited thereto. For example, the upper cover portion 20a and the lower cover portion 20b may be integrally formed to constitute the first cover portion 20. The shapes of the first cover portion 20 and the second cover portion 22 are not limited the above-described shapes, and may be changed as appropriate as long as the first cover portion 20 comes into intimate contact with the first face 31 of the filter member 3, and the second cover portion 22 comes into intimate contact with the second face 33 of the filter member 3. For example, the second cover portion 22 does not need to have the side wall portion 220, and may only have the bottom portion 227.

<7>

The number of first protrusions 208 and second protrusions 224 is not limited to one as in the above embodiments.

For example, two or more first protrusions 208 and second protrusions 224 may be formed concentrically. In this case, the number of first protrusions 208 formed may differ from the number of second protrusions 224.

<8>

The modes of the ribs 250 and openings 223b are not limited to the example shown in FIGS. 7 and 8. That is to say, the mode of the ribs 250 and the mode of the openings 223b can be changed in any combination. For example, the ribs 250 may alternatively be formed so as to be continuous with the side wall portion 21 at two ends in the circumferential direction as shown in FIGS. 7 and 8, or may be formed to have a wall shape that rises from the bottom portion 227 independently of the side wall portion 21. From the viewpoint of maintaining the strength of the ribs 250, at least some of the ribs 250 are preferably formed so as to be continuous with the side wall portion 21. Further, the cross-sectional shape of the ribs 250 is not limited to the shape shown in FIGS. 7 and 8, and may be changed as appropriate. In the example shown in FIGS. 7 and 8, the openings 223b are open laterally and downward of the second cover portion 22, but the mode of the openings 223b is not limited thereto. For example, the open holes 223b may be open only downward of the second cover portion 22, as the open holes 223a shown in FIG. 3D are. In another example, the openings 223b may be open only laterally of the second cover portion 22. In this case, the openings 223b may be formed above the face 221 of the bottom portion 227, and a portion of the side wall portion 21 that is sandwiched between the face 221 and a lower end of the openings 223b may be the first resisting portion.

<9>

Figure 11:
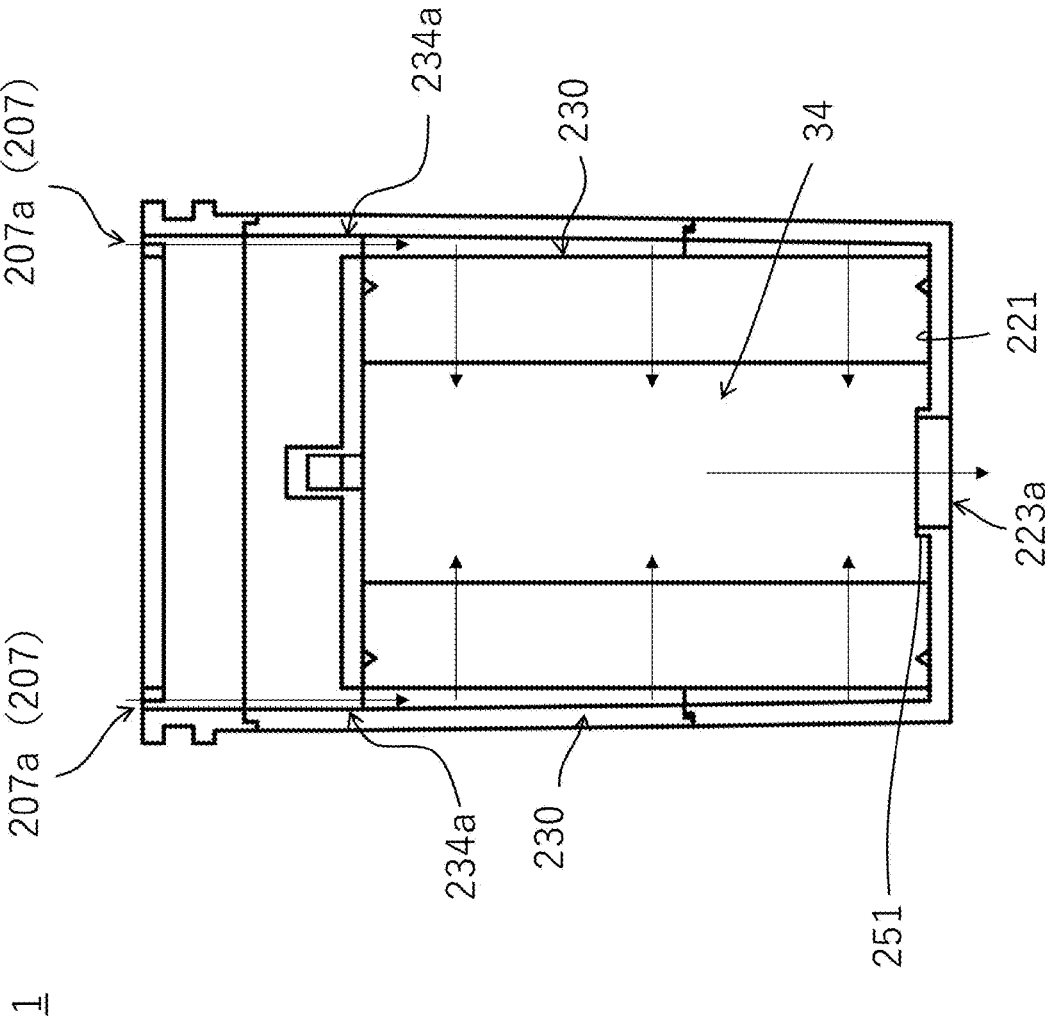
FIG. 11 is a cross-sectional view illustrating a flow of water within the out-in type cartridge.

The modes of the rib 251 and the open hole 223a are not limited to the example shown in FIG. 11. That is to say, the mode of the rib 251 and the mode of the open hole 223a can be changed in any combination. For example, in the example in FIG. 11, the rib 251 defines the open hole 223a. However, a rib 251 may be formed that rises from the face 221 independently of a peripheral portion that defines the open hole 223a. If a plurality of open holes 223a are formed, the rib 251 may be provided at a peripheral edge of each open hole 223a, or the rib 251 may be provided so as to surround the plurality of open holes 223a. Further, the cross-sectional shape of the rib 251 is not limited to the shape shown in FIG. 11, and may be changed as appropriate.

EXAMPLES

Examples and a comparative example will be given below to describe the present invention in detail. However, the present invention is not limited to the examples.

Six types of water purification cartridges that are the same as the above-described first embodiment were prepared as examples 1 to 6. All of the filter members of the water purification cartridges in the examples 1 to 6 were formed with a sheet that is made of a mixture of fibrous activated carbon and thermally bonded fiber, and were manufactured by the manufacturing method illustrated in FIG. 12. In the filter members of the water purification cartridges in the examples 1 to 3, a sealant (a hot melt adhesive containing ethylene vinyl acetate (EVA) as a main component) was applied to the first face and the second face, and the hardness of the filter members was 86. The water purification cartridges in the examples 1 to 3 had a common configuration and were formed to have the same dimensions except that the length L1 of the filter member differed as shown in Table 1 below. In the filter members of the water purification cartridges in the examples 4 to 6, the sealant was not applied to the first face or the second face, and the hardness of the filter member was 65. The water purification cartridges in the examples 4 to 6 had a common configuration and were formed to have the same dimensions except that the length L1 of the filter member differed as shown in the table 1 below.

As a comparative example 1, the same casing as those of the examples 1 to 6, and a filter member that is formed by compressing a material that is made of granular activated carbon and thermosetting resin (binder) and does not contain fibrous activated carbon, were prepared. The shape of this filter member was the same as those of the filter of the examples 1 to 6, and the sealant was not applied to the first face or the second face. The hardness of the filter member in the comparative example 1 was 90.

The configuration and the dimensions of the casing are common to the examples 1 to 6 and the comparative example 1. The material of the casing was ABS resin, and the hardness thereof was 95. L2 and L3 of the casing were 53 mm and 51.2 mm, respectively. The characteristics of the examples 1 to 6 and the comparative example 1 are as collectively shown in Table 1.

TABLE 1

| Number | Examples | | | | | | Comparative example |
|---|---|---|---|---|---|---|---|
| | 1 | 2 | 3 | 4 | 5 | 6 | 1 |
| Filter member | Sheet-shaped mixture of fibrous activated carbon and thermally bonded fiber | | | | | | Mixture of granular activated carbon and thermosetting resin |
| Hardness of filter member | 86 | | | 65 | | | 90 |
| Application of sealant | Applied | | | Not applied | | | Not applied |
| L1 (mm) | 52.4 | 52.6 | 53.0 | 52.4 | 52.6 | 53.0 | 52.4 |
| L2/L1 × 100 (%) | 101.1 | 100.8 | 100.0 | 101.1 | 100.8 | 100.0 | |
| L3/L1 × 100 (%) | 97.7 | 97.3 | 96.6 | 97.7 | 97.3 | 96.6 | |

(Experiment)

Water containing free residual chlorine with an initial concentration of 2 mg/L was passed through each of the water purification cartridges of the examples 1 to 6 and the comparative example 1, and the presence of leakage was checked. Also, with the water purification cartridges in the examples 1 to 6, the filter member was removed from the casing after passing the water therethrough, the distance L4 between a portion of the casing that came into contact with the first contact portion (first protrusion) and a portion of the casing that came into contact with the second contact portion (second protrusion) was measured, and the degree of elastic recovery of the filter member was evaluated based on the proportion W (%) of the distance L4 to the length L1.

(Experimental Results)

Examples 1 to 3: Water containing free residual chlorine with an initial concentration of 2 mg/L was passed through the water purification cartridges, and no leakage was found. That is to say, it was confirmed that raw water that flowed into the hollow portion of the filter member can be prevented from passing through a gap between the first face and the first cover portion and a gap between the second face and the second cover portion, and that the passage of the raw water through the filter member can be promoted. The proportion W was 99.5%, and the filter member elastically recovered substantially to almost the same degree as before the water was passed through the water purification cartridges.

Examples 4 to 6: Water containing free residual chlorine with an initial concentration of 2 mg/L was passed through the water purification cartridges, and no leakage was found. That is to say, it was confirmed that raw water that flowed into the hollow portion of the filter member can be prevented from passing through a gap between the first face and the first cover portion and a gap between the second face and the second cover portion, and that the passage of the raw water through the filter member can be promoted. The proportion W was about 98 to 99%.

Comparative example 1: When the filter member was attempted to be accommodated in the casing, the filter member was hardly elastically deformed and therefore cannot be sufficiently compressed, and the first face and the second face was partially scraped and partially collapsed. As a result of the filter member being accommodated in this state in the casing and water being passed therethrough, raw water leaked.

REFERENCE SIGNS LIST

1 Cartridge
2 Casing
3 Filter member
20 First cover portion
21 Side wall portion
22 Second cover portion
31 First face
32 Side circumferential portion
33 Second face
34 Hollow portion
203 Face
207 Inflow portion
208 First protrusion (first contact portion)
221 Face
223 Outflow portion
224 Second protrusion (second contact portion)
230 Space
300 Sheet

The invention claimed is:

1. A water purification cartridge comprising:
a casing with a tubular shape that has an inflow portion formed in an upper portion for raw water to flow in, and an outflow portion formed in a lower portion for purified water to flow out; and
a filter member for filtering the raw water, the filter member being accommodated within the casing,
wherein the filter member is elastic and formed to have a cylindrical shape having a hollow portion, and has a first face and a second face at respective ends in an axial direction,
the casing includes:
a first cover portion that covers the first face of the filter member;
a second cover portion that covers the second face of the filter member; and
a side wall portion that covers an outer circumferential face of the filter member,
in the first cover portion, a first contact portion is formed that annularly comes into contact with the first face of the filter member so as to surround a circumference of the hollow portion and that presses the filter member in the axial direction to elastically deform the filter member,
in the second cover portion, a second contact portion is formed that annularly comes into contact with the second face of the filter member so as to surround the circumference of the hollow portion and that presses the filter member in the axial direction to elastically deform the filter member,
in the side wall portion, a vent is formed that makes inside and outside of the casing to be in communication with each other, and
the filter member is accommodated within the casing so as to form a space between the outer circumferential face of the filter member and the side wall portion, in a state where the filter member is elastically deformed by a pressing force of the first contact portion and the second contact portion,
wherein at least one of the first contact portion and the second contact portion is an annular protrusion that protrudes toward the internal space of the casing,
wherein the first contact portion is configured to engage with the first face or the second contact portion is configured to engage with the second face,
wherein the second cover portion includes a bottom portion in which the second contact portion is formed and a second side wall portion that continuously rises from the bottom portion,
the outflow portion is a plurality of open holes that are formed in the bottom portion or the second side wall portion so as to be located outside in a radial direction of the second contact portion, and
wherein the raw water that has flowed in from the inflow portion of the casing flows into the hollow portion of the filter member via the first cover portion, passes outward in a radial direction through the filter member and flows out, as the purified water, to the space, and is discharged from the outflow portion to the outside.

2. The water purification cartridge according to claim 1, wherein both of the first contact portion and the second contact portion are an annular protrusion,
wherein the first contact portion is configured to engage with the first face and the second contact portion is configured to engage with the second face.

3. The water purification cartridge according to claim 1, wherein the casing is made of a plastic material, and
the filter member contains fibrous activated carbon, and a hardness thereof is 86 or less, wherein the hardness is measured using the method provided in JIS S 6050 "Plastic erasers" and is an average of the measurement value at N=5.

4. The water purification cartridge according to claim 2, wherein the casing is made of a plastic material, and
the filter member contains fibrous activated carbon, and a hardness thereof is 86 or less, wherein the hardness is measured using the method provided in JIS S 6050 "Plastic erasers" and is an average of the measurement value at N=5.

5. The water purification cartridge according to claim 1, wherein a sealant is applied to at least one of the first face of the filter member and the second face of the filter member.

6. The water purification cartridge according to claim 2, wherein a sealant is applied to at least one of the first face of the filter member and the second face of the filter member.

7. The water purification cartridge according to claim 1, wherein at least one of the first cover portion and the second cover portion includes a rib extending in the axial direction of the filter member, and
the filter member is accommodated in a state of being positioned by the rib so as to have a space between the outer circumferential face of the filter member and the side wall portion of the casing.

8. The water purification cartridge according to claim 2, wherein at least one of the first cover portion and the second cover portion includes a rib extending in the axial direction of the filter member, and
the filter member is accommodated in a state of being positioned by the rib so as to have a space between the outer circumferential face of the filter member and the side wall portion of the casing.

9. The water purification cartridge according to claim 1, wherein an elastic member is not provided between the first contact portion and the first face of the filter member and between the second contact portion and the second face of the filter member.

10. The water purification cartridge according to claim 2, wherein an elastic member is not provided between the first contact portion and the first face of the filter member and between the second contact portion and the second face of the filter member.

11. The water purification cartridge according to claim 1, wherein the casing further has, between the outer circumferential face of the filter member and the outflow portion, a first resisting portion serving as a resistance against a flow of the purified water that has flowed out to the space.

12. The water purification cartridge according to claim 2, wherein the casing further has, between the outer circumferential face of the filter member and the outflow portion, a first resisting portion serving as a resistance against a flow of the purified water that has flowed out to the space.

13. The water purification cartridge according to claim 1, wherein the filter member is accommodated in the casing in an orientation in which the first face faces upward and the second face faces downward, and
the vent is located above the first face in the side wall portion of the casing.

14. The water purification cartridge according to claim 2, wherein the filter member is accommodated in the casing in an orientation in which the first face faces upward and the second face faces downward, and
the vent is located above the first face in the side wall portion of the casing.

15. The water purification cartridge according to claim 3, wherein the filter member is accommodated in the casing in an orientation in which the first face faces upward and the second face faces downward, and
the vent is located above the first face in the side wall portion of the casing.

16. The water purification cartridge according to claim 4, wherein the filter member is accommodated in the casing in an orientation in which the first face faces upward and the second face faces downward, and
the vent is located above the first face in the side wall portion of the casing.

17. The water purification cartridge according to claim 1, wherein the casing accommodates no further filter materials below the filter member.

18. The water purification cartridge according to claim 2, wherein the casing accommodates no further filter materials below the filter member.

19. The water purification cartridge according to claim 3, wherein the casing accommodates no further filter materials below the filter member.

20. The water purification cartridge according to claim 4, wherein the casing accommodates no further filter materials below the filter member.

* * * * *